(12) United States Patent
Kohlheb et al.

(10) Patent No.: US 8,602,433 B2
(45) Date of Patent: Dec. 10, 2013

(54) ALTERNATING DRIVE, PRIMARILY FOR BICYCLES AND SIMILAR DRIVEN VEHICLES

(75) Inventors: Robert Kohlheb, Pomaz (HU); Mihaly Lantos, Budapest (HU)

(73) Assignee: Stringdrive Technologies KFT., Szolnok (HU)

( * ) Notice: Subject to any disclaimer, the term of this patent is extended or adjusted under 35 U.S.C. 154(b) by 126 days.

(21) Appl. No.: 13/143,224

(22) PCT Filed: Jan. 21, 2010

(86) PCT No.: PCT/HU2010/000009
§ 371 (c)(1),
(2), (4) Date: Jul. 5, 2011

(87) PCT Pub. No.: WO2010/084363
PCT Pub. Date: Jul. 29, 2010

(65) Prior Publication Data
US 2011/0266768 A1 Nov. 3, 2011

(30) Foreign Application Priority Data
Jan. 21, 2009 (HU) .................................. 0900032

(51) Int. Cl.
*B62M 1/08* (2006.01)
(52) U.S. Cl.
USPC ........................................................ 280/251
(58) Field of Classification Search
USPC ......................................... 280/251, 252, 262
See application file for complete search history.

(56) References Cited

U.S. PATENT DOCUMENTS

| | | | | |
|---|---|---|---|---|
| 4,379,566 A * | 4/1983 | Titcomb | ......................... | 280/251 |
| 4,574,649 A * | 3/1986 | Seol | ............................... | 74/138 |
| 5,833,257 A | 11/1998 | Kohlheb et al. | | |
| 6,648,355 B2 * | 11/2003 | Ridenhour | ..................... | 280/255 |
| 7,497,453 B2 * | 3/2009 | Fan | ............................... | 280/252 |

FOREIGN PATENT DOCUMENTS

DE 27 58 795 A1 7/1979
WO 9718123 A1 5/1997

OTHER PUBLICATIONS

Racz, et al., "String Bike", Jul. 28, 1999, XP002582998.
International Search Report issued in PCT/HU2010/000009, dated May 20, 2010.

* cited by examiner

*Primary Examiner* — Tony Winner
(74) *Attorney, Agent, or Firm* — Handal & Morofsky LLC

(57) ABSTRACT

Alternating drive primarily for bicycles and similar driven vehicles, in which the rotation of driven pedals are converted into reciprocating swinging motion of swinging arms, and the swinging arms have respective driving arms (16, 16') coupled to a head portion (14, 14') surrounding the swinging shaft (11) of the pedals from which a traction arm (17, 17') is extending out that closes an angle with the driving arm and the remote ends of the driving and traction arms (16, 17) are interconnected by a connection arm (20, 20') A substantially triangular opening is formed between these arms, and the shaft of a driving wheel (15, 15') is positioned in this opening, the traction arm defines a traction path (19, 19'), and a flexible pulling rope (28) that rotates the driven wheel of the vehicle is led around at least one rope wheel (26) that has a shaft (35) guided and led along the traction path for adjusting the transmission ratio.

23 Claims, 14 Drawing Sheets

ALTERNATING DRIVE, PRIMARILY FOR BICYCLES AND SIMILAR DRIVEN VEHICLES

BACKGROUND OF THE INVENTION

The invention relates to an alternating drive, primarily for bicycles and similar driven vehicles, wherein the vehicle comprises a frame and a driven wheel pivotally connected to the frame, the drive comprises a pair of identically designed drive units with opposite driving directions mounted to respective sides of the frame, each of the drive units comprises respective swinging arms pivoted around a common swinging shaft mounted in the frame to perform alternating swinging motion around the swinging shaft, each swinging arm has a respective driving arm with an edge defining a driving path, the driving units comprise a common driving shaft mounted and pivoted in the frame for circular motion around a driving axis, each driving unit comprises a respective bolt with an axis substantially parallel to the driving axis and connected to and rotating with the common driving shaft along respective circular paths around the driving axis, and a driving wheel connected to and pivoted on the bolt, the driving wheels are pressed to the associated one of the driving paths so that the during the rotation of the driving wheels their surfaces roll in a first and then in a returning second direction along the associated driving path causing thereby the swinging arm to perform an alternating swinging motion, the driving wheels are mechanically connected to each other and in each position they are by 180° angularly offset with respect to each other around the driving shaft, respective flexible ropes are connected to an associated one of the swinging arms, and respective biased rope drums mounted around the shaft of the driven wheel and connected to the driven wheel in a manner that allows transmission of torque to the wheel from the rope drum in a single but mutually different direction of rotation only, wherein said ropes are connected to and wound with respective predetermined number of turns around the associated rope drum so that during the driving operation the number of the turns is changing in a mutually alternating manner.

The term "alternating drive" designates a driving system in which the output element of the driving source which provides the driving power is rotating around a circular path, and this circular motion is converted first into an alternating swinging movement, then the swinging element is used to drive the driven wheel of the vehicle mounted on the frame of the vehicle. A condition of the operation of an alternating drive is to comprise a pair of identical but oppositely positioned driving units, and the driving curves of the driving unit should have a certain overlap so that in any moment at least one oldie units be in driving position.

An alternating drive developed for bicycle applications is described in U.S. Pat. No. 5,833,257 which discloses the properties of such drives in detail. The patent shows several embodiments of which from practical grounds the bar link mechanism shown in FIG. 11 or the cam drive shown in FIG. 16 appears realizable. An obvious advantage of the cam drive lies in that by the appropriate design of the shape of the cam disc the properties of the driving characteristic can be changed within a wide range, however in the embodiment shown the cam disc has a big size and weight and the presence of the cam disc substantially limits the applicability of the swinging element for traction purposes.

SUMMARY OF THE INVENTION

A preferred and developed embodiment of the cam drive embodiment can be learned from the home page www.skyex-.com/stringbike wherein the pictures of a bicycle are shown which was exhibited in the international bicycle exhibition INTERBIKE in the year 1999 in Las Vegas and also in the EUROBIKE exhibition in Friedrichshafen (Germany) in 1998. In this embodiment the driving swinging arm was designed as a two-armed lever, and the outer edge of the cam disc was pressed against the outer ring of a ball bearing fixed to the lower end of the two-armed lever. The change of the transmission ratio was provided by the sliding movement of a rope wheel guided along the other arm of the lever. A drawback of this design was that pressing forces applied by the cam disc on the shaft of the two-armed lever were very high which tried to twist the frame and a specially designed strong bearing had to be provided to resist such high loads. A further drawback was that the forward-backward motion of the swinging arm was transferred to a rope drum on the rear wheel of the bicycle by a single rope wheel, and when during the swinging motion the number of turns on the rope wheel was changing, then the forces acting on the swinging arm had components falling not only in the plane of its movements but also in transverse direction, which transverse component tried to bend the swinging arm and its bearing had to be designed to bear such an unwanted torque. The rope made by a plastic material could not resist the high bending loads and according to life time tests it got broken after each 600-800 km of operation. A further disadvantage was that a separate rope-biasing assembly was required to return the swinging arm into its original position in each swinging cycle, and the assembly required a substantial space on the frame and on the rope drum, and its presence increased manufacturing costs.

According to FIG. 11 of the cited publication the driving arm was composed of two pieces closing an obtuse angle with each other, and in a connection shaft of the pieces a ball bearing was provided that rolled along an internal linear recess of the swinging arm designed as a link-bar, wherein in either direction of movement of the swinging arm the ball bearing rolled along respective opposite walls of the linear recess. The symmetry line of the link went through the centre of the swinging motion. Based on the limitations of the design there was no possibility for adjusting or changing the driving characteristics, and the driving characteristic which was obtainable by this classic link-drive was sharply different from the driving sensation provided by those of chain driven bicycles using circular gears. A further problem with such design was the difficulty in changing the transmission ratio, because there was no sufficient place on the linear swinging arm along which the rope wheel could be moved along so that its free movement is not limited by the presence of the frame, especially of the rear fork.

In spite of the problems described above the advantages connected with the alternating drive are substantial, and they are summarized in the table published in the cited web-site, namely with this driving system the transmission ratio can be changed at any time, the system is not sensitive against contamination, wear and humidity, it has a high degree of efficiency since it uses only rolling elements in the driving system. A further advantage is the lack of using chain and the limitations connected with the presence of chain including the difficulty of the removing the driven rear wheel.

The object of the present invention is to retain the above outlined advantages of alternating drives in combination with the elimination or substantial decrease of its drawbacks, including the creation of driving curve very close to that provided by the chain-driven bicycles and which substantially decreases the twisting load acting on the shaft of the swinging arm and thereby on the frame.

According to a second aspect of the invention a drive system should be provided in which the rope can endure the bending load acting thereon coming from the repeated winding on and off the rope drum and from the fluctuating pulling forces without the danger of getting torn or broken.

According to a further aspect it is also an object of the invention to provide an easy and simple adjustment of the transmission ratio both under load and no-load conditions of the bicycle.

These and other objects have been attained by the design of the alternating drive as claimed in the attached claims.

The alternating drive according to the invention can be used primarily for bicycles, but it can preferably be used in case of tricycles and of special bicycles. The possibility of easily changing the transmission ratio renders applications in smaller vehicles driven by electric or conventional engines of smaller power. Especially in case of electric motors the need for high starting torque is difficult to meet because an electric motor designed for a given power has a small starting torque as nominal power can be obtained at higher motor speeds only. In such cases the use of the drive according to the invention can represent an ideal solution. If the rotation is not provided by a driving arm moved by human power, one has to provide only for the rotation of the driving wheel around a driving shaft.

BRIEF DESCRIPTION OF THE DRAWINGS

The alternating drive according to the invention will now be described in connection with preferable embodiments, wherein reference will be made to the accompanying drawings. In the drawings.

DETAILED DESCRIPTION OF THE PREFERED EMBODIMENTS

Figure 1:
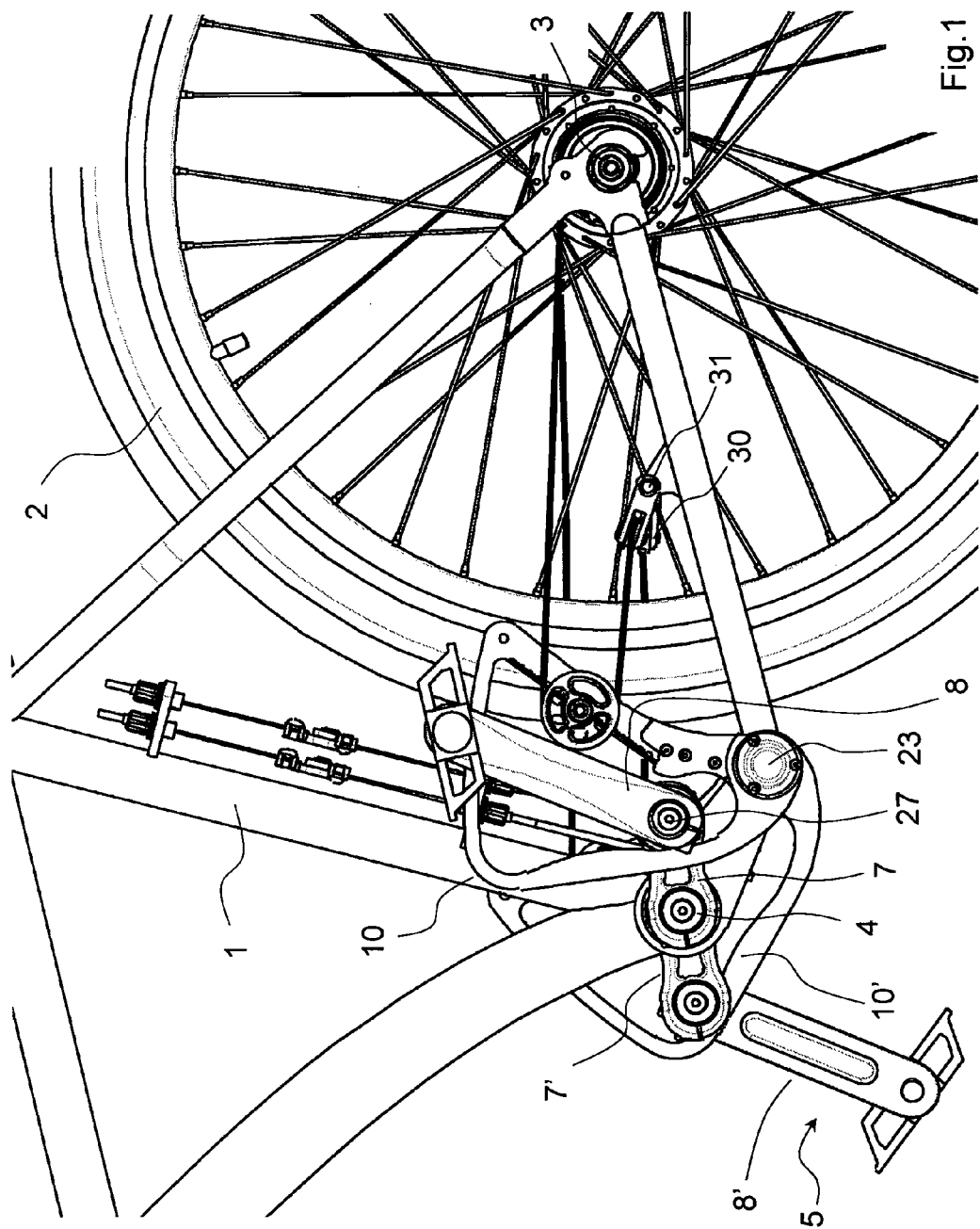
FIG. 1 shows a detail of a bicycle provided with the drive in perspective view.
Figure 2:
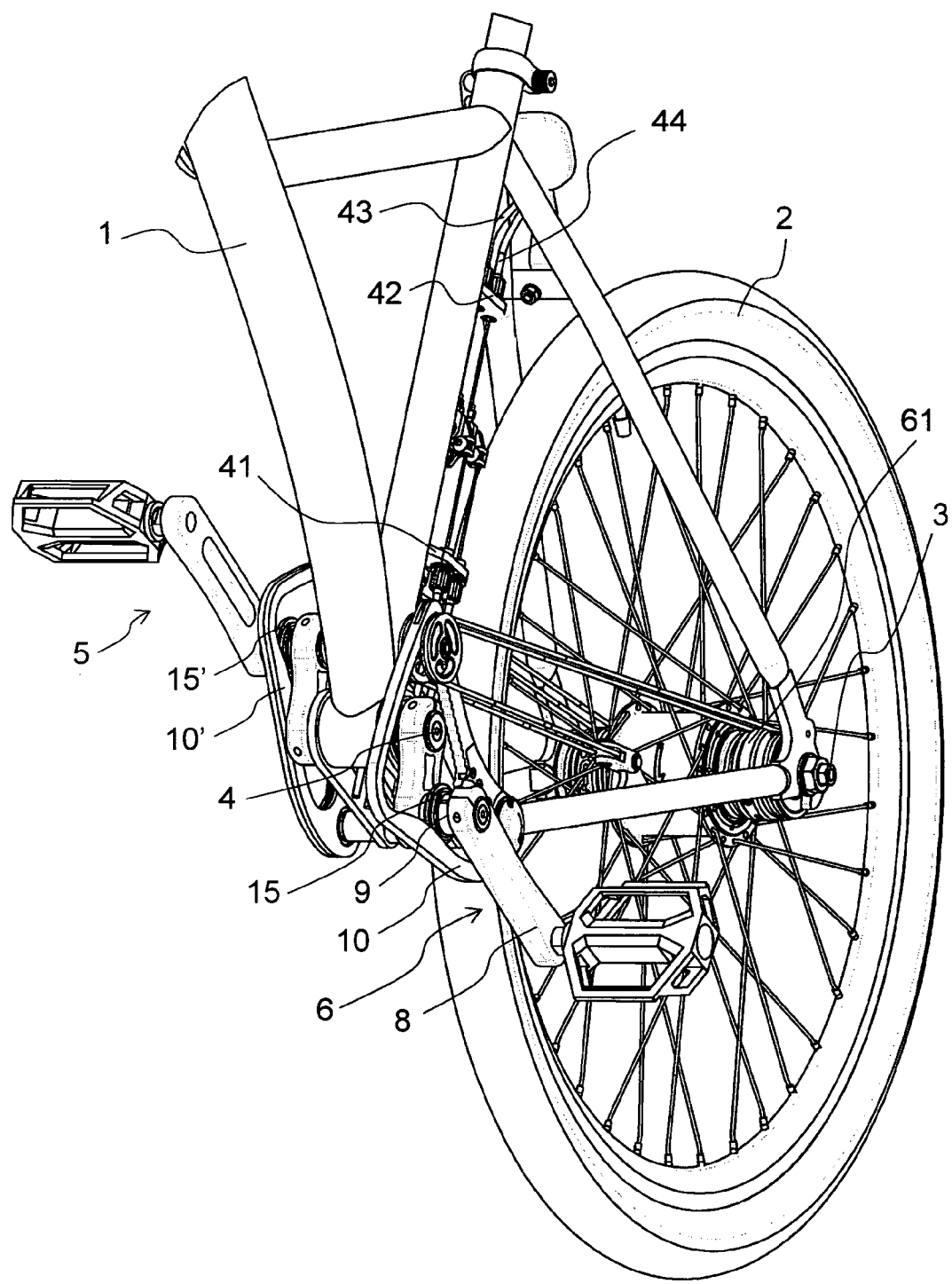
FIG. 2 shows the perspective view of the bicycle of FIG. 1 from a different view.

FIGS. 1 and 2 show the perspective view of a detail of the bicycle provided with the drive using the swinging arms according to the present invention taken from two different views. Apart from the drive system used the bicycle is provided with conventional parts or units that comprise a rigid frame 1 made of tubular elements which has respective first and rear wheel holding forks, and at the end region of the rear fork respective recesses or nests are provided for fixing ends of shaft 3 of a rear wheel 2. The first fork and the first wheel have not been illustrated in the drawing, since the first wheel is not driven.

The frame 1 has frame rods extending and diverging from below substantially in a V-shape towards the handle and the saddle, respectively, and these rods are coupled to each other at their lower ends, and in this region of connection a lower hollow connection member is provided which has a different design compared to the similar connection region of conventional bicycles. The difference lies in that in the present design not only a single sleeve is provided that has an axis normal to the plane of the frame adapted to pivotally hold a driving shaft 4 that connects respective driving arms 5, 6 arranged at the left and right sides of the bicycle but the connection member is provided with a second sleeve lower and shifted in rear direction which has the task of holding and pivotally supporting respective swinging arms 10, 10' also arranged at respective sides of the bicycle which can be turned around this shaft independent from each other.

In transversal direction the driving shaft 4 is lead through and extends out laterally in and from the first sleeve which provides for its pivotal support and the respective shaft ends are rigidly connected to the respective ones of the driving arms 5 and 6, designed in a different way from conventional pedal arms. The driving arms 5 and 6 have the same shape but their positions are turned around from each other by 180°. Each of the driving arms 5, 6 comprises a respective pair of shanks 7, 8 and 7', 8' that close an obtuse angle with the other one in the pair, and the corresponding shanks are rigidly interconnected with each other by means of respective transversal bolts 9, 9' (the bolt 9 is shown in FIG. 2). The shanks 7 and 8 close an angle between about 100 and 120°, preferably 110°. The inner shank 7 that belongs to the driving arm 6 at the left side of the bicycle is offset by 180° relative to the inner shank 7' of the driving arm 5 at the right side of the bicycle, and the outer shank 8 is extending in parallel to the outer shank 8' at the other side, but their directions are mutually opposite, thus the driving arms 5 and 6 at the left and right sides are always take mutually opposite positions as it is customary at conventional bicycles (FIG. 1). For the sake of uniform designations corresponding elements at the left and right sides of the bicycle are distinguished so that the reference numerals of the elements at the right side are provided with a (') symbol. The central axes of the inner and outer shanks 7, 8 do not lie in the same plane, but these planes are spaced in transversal direction. The spacing is defined by the length of the bolt 9. Respective driving wheels 15 (and at the other side 15') are fixed and journaled to the bolts 9, 9' which have the task to transfer the force (torque) exerted by the cyclist on the driving arms 5 and 6 to the respective swinging arms 10, 10'.

Figure 3:
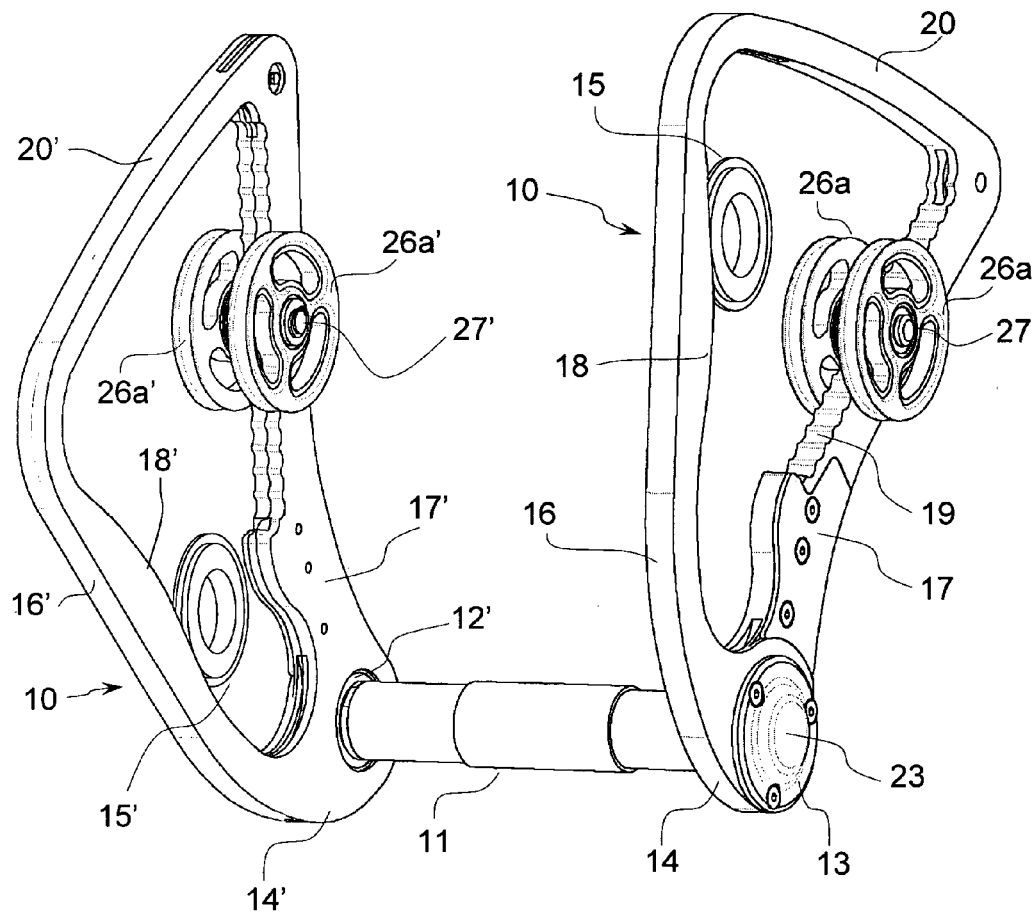
FIG. 3 shows the perspective view of the swimming arm, wherein certain elements of the bicycle have not been shown.

FIG. 3 shows the two swinging arms 10, 10', a swinging shaft 11 that interconnects the swinging arms 10, 10', the two driving wheels 15, 15' which move the swinging arms 10, 10' and rope wheels 26a, 26b and 26a', 26b' that slidably engage the swinging arms 10, 10' as a separate unit as if the remaining parts of the bicycle were invisible. The swinging arms 10, 10' are connected to each other by means of the swinging shaft 11 guided for alternating rotary motion in the aforementioned second or auxiliary sleeve so that respective bearings 12, 12' are arranged at both end regions of the swinging shaft 11, and the bearings 12, 12' have outer rings fitted in respective bores made in the inner parts of the swinging arms 10, 10'. The outer portions of the bearings 12, 12' are covered by respective dust protection caps 13, 13'. The driving arms 5 and 6 at the left and right sides of the bicycle form a single rigid unit, whereas the swinging arms 10 and 10' are only interconnected but they can freely rotate relative to each other around the swinging shaft 11.

Figure 6:
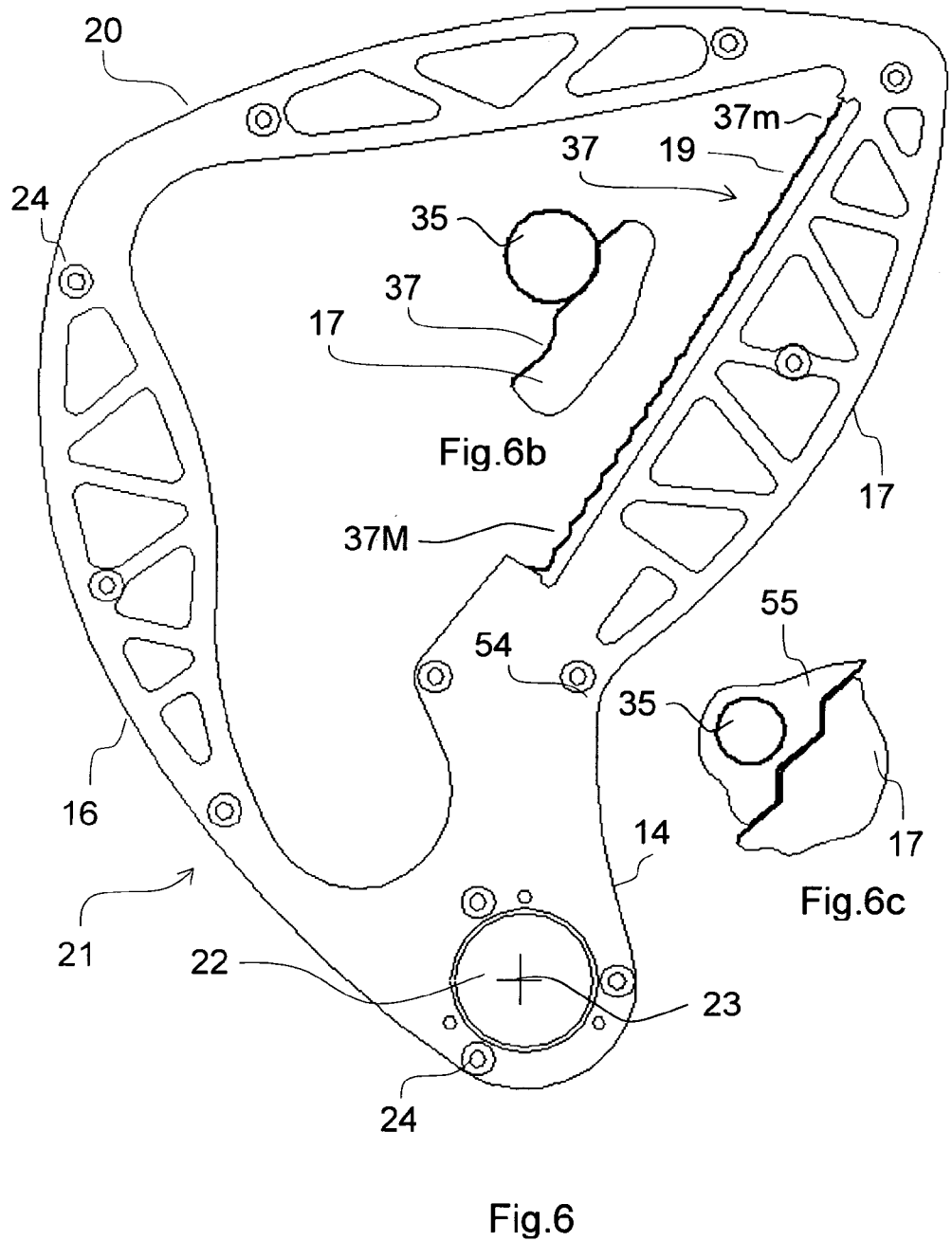
FIG. 6 is the side view of an embodiment of the swinging arm.

The swinging arms 10, 10' are elements with roughly triangular shape and having a large central opening and their main constructional parts comprise inner head portion 14, 14' which have an arced shape and define the bores that receive with a tight fitting the respective outer rings of the bearings 12, 12'. From the head portion 14 two diverging arms are extending in outward direction that close an acute angle with each other, of which the frontal arms (being closer to the first wheel) have the function of acting as driving arms 16, 16' and the rear arms (closer to the rear wheel) act as traction arms 17, 17'. The driving arms 16, 16' define respective identical driving paths 18, 18' and the traction arms 17, 17' define respective identical traction paths 19, 19'. The end regions of both the driving arms 16, 16' and of the traction arms 17, 17', which are the farthest away from the head portion 14, 14' are connected by respective connection arms 20, 20' that ensure rigidity and loadability. The connection arms 20, 20' can be made by the easiest way as illustrated i.e. from a single plate, but in view of that fact that load is exerted only in the forward part of the swinging movement, the connection arms 20, 20' can also be pivotally coupled to the neighboring arms. The swinging arms 10, 10' can be made by a single sheet material but for the sake of providing sufficient rigidity and ensuring an economic use of raw materials, it is preferred if each arm is made by a pair of spaced identically shaped metal sheet, which can be preferably a stainless steel plate, wherein these sheets are connected to form a single unit. The spacing or distance between the sheets can be utilized for receiving certain constructional elements. FIG. 6 shows the design of such a preferable swinging arm piece 21. A difference compared to that shown in FIG. 3 lies in that in this embodiment the driving arm 16, the traction arm 17 and the connection arm 20 all have a grid structure that provides a good loadability with small weight. FIG. 6 shows the bore 22 made in the head portion 14 which receives the outer ring of the bearing 12. The swinging arm piece 21 turns and swings around the centre of the bore 22 as a center of rotation 23.

Figures 4, 5:
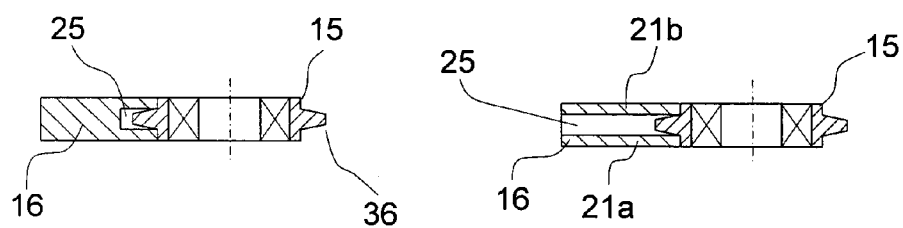
FIG. 4 is a sectional sketch view showing the connection of the driving wheel and a driving arm.
FIG. 5 is a similar sketch to FIG. 4 in case of a different embodiment.
Figure 16:
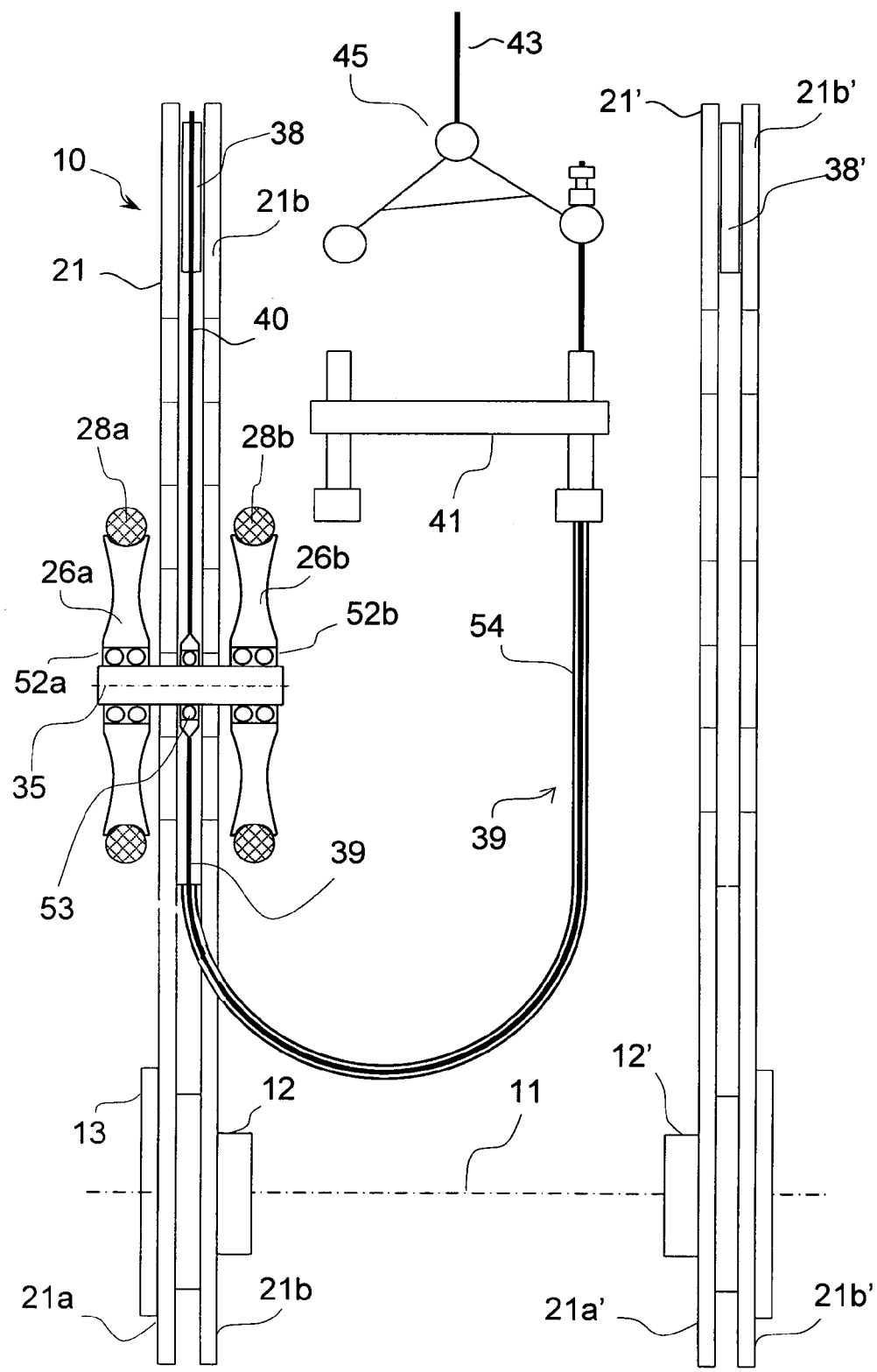
FIG. 16 shows the side view of the swinging arm also showing the path of the controlling Bowden wires.

In FIG. 6 a plurality of smaller bores 24 are shown which together with bolts lead therethrough connect the swinging arm piece 21 with the other spaced swinging arm piece 21b behind it (this second piece is not visible in FIG. 6 but can be observed in FIGS. 5 and 16). The spacing between the swinging arm pieces 21 and 21a and 21' and 21b' can be preferably between 1.5 to 3 mm, and the pieces can be made by stainless hardened steel sheets of 2 to 2.5 mm.

For understanding the movements of the swinging arms 10, 10' FIGS. 1 and 2 should be compared with FIG. 3 and it should be observed that the driving wheels 15, 15' are rotated and fixed on the bolts 9, 9' that connect the shanks 7, 8 of the driving arms 5, 6, and these driving wheels 15, 15' are engaging and rolling along the driving paths 18, 18' of the driving arms 16, 16'. FIGS. 4 and 5 are sectional views taken normal to the plane of the driving arm 16 of the swinging arm 10 which show the engagement of the driving wheel 15 to the driving arm 16. FIG. 4 shows the embodiment in which the swinging arm 10 is made by a single thicker sheet. In that case the edge of the driving arm 16 of the swinging arm 10 that faces towards the driving wheel defines a recess 25. FIG. 5 is in correspondence with the embodiment of FIG. 6, wherein the swinging arm 10 comprises a pair of spaced and connected swinging arm pieces 21 and 21b. In this embodiment the space between the pieces constitutes the recess 25 which need not be tooled as a separate operational step. In FIGS. 4 and 5 it can be seen that the edge profile of the driving wheel 15 comprises a nose 36 that extends out of the edge and fits in the recess 25. The presence of the nose 36 provides a stable positioning and guidance for the driving wheel 15 in the direction normal to the plane of the drawing. When the driving arms 5,6 are rotated, the driving wheel 15 will move along a circular path around the centre line of the driving shaft 4, and this circular movement will determine the swinging movement of the swinging arm 10 around the center of rotation 23 as it will be later explained. Before the description of this guided movement reference is made again to FIG. 3, which show the presence of respective pairs of rope wheels 26a, 26b and 26a' and 26b' just in front (i.e. to the direction towards the front wheel of the bicycle) of the traction arms 17, 17' which have shafts engaging the respective one of the traction paths 19, 19'. These rope wheels have respective connection shafts 35, 35' (these shafts 35, 35' are covered and not visible in FIG. 3 but can be seen in FIGS. 8 and 16) have respective axes of rotation 27. 27'. During their reciprocating swinging movement the swinging arms 10, 10' transfer the driving force through the ropes wound around these rope wheels 26 a, b and 26 a, b' to the rear wheel 2.

Figure 7:
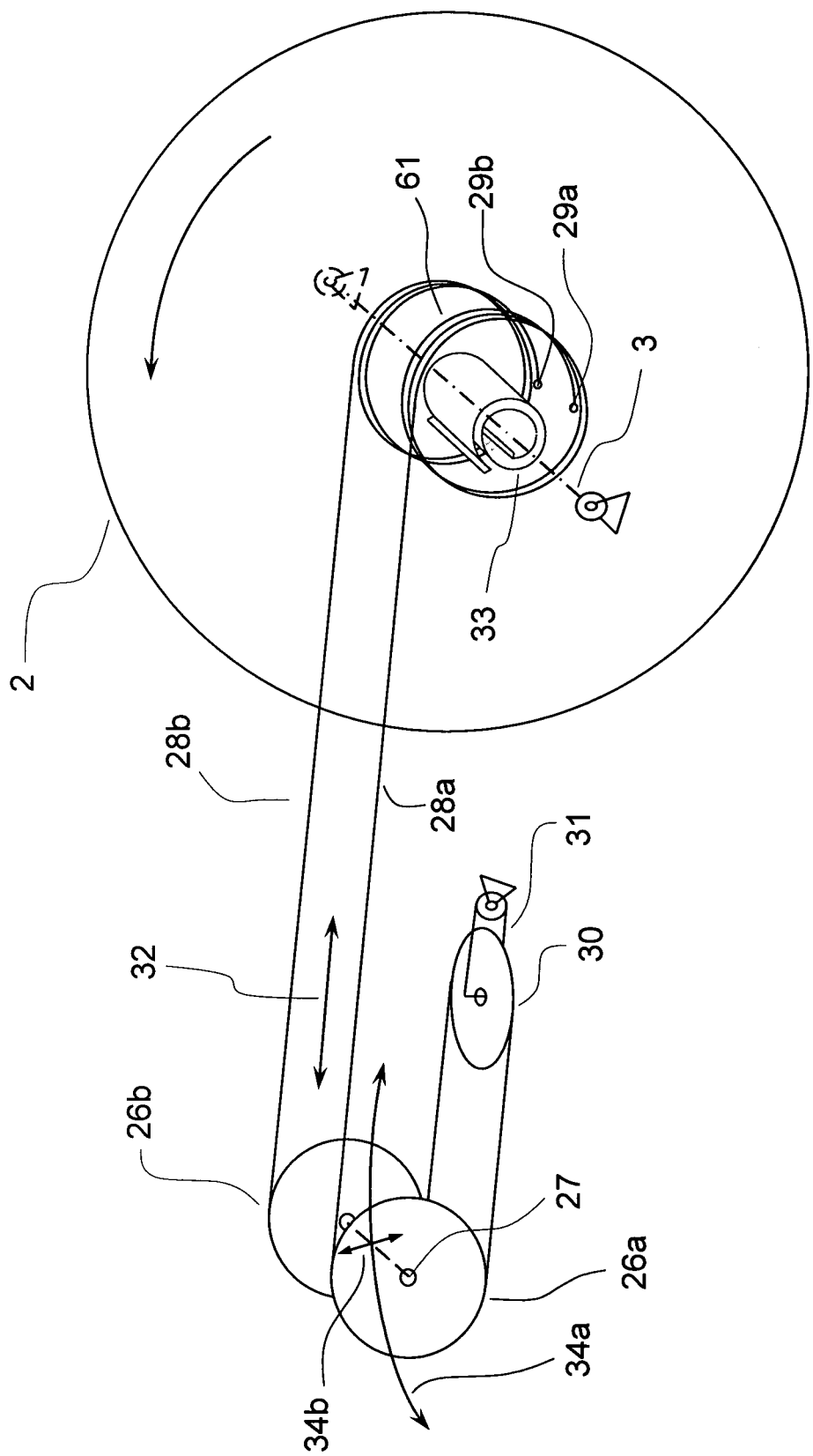
FIG. 7 is a simplified perspective view illustrating the path of the rope branches.
Figure 18C:
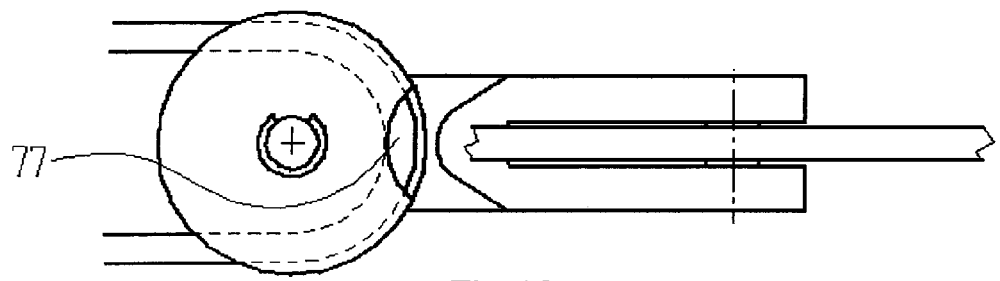
FIG. 18 shows three sketches of the rock lever used to connect the driving rope to the frame.
Figure 18B:
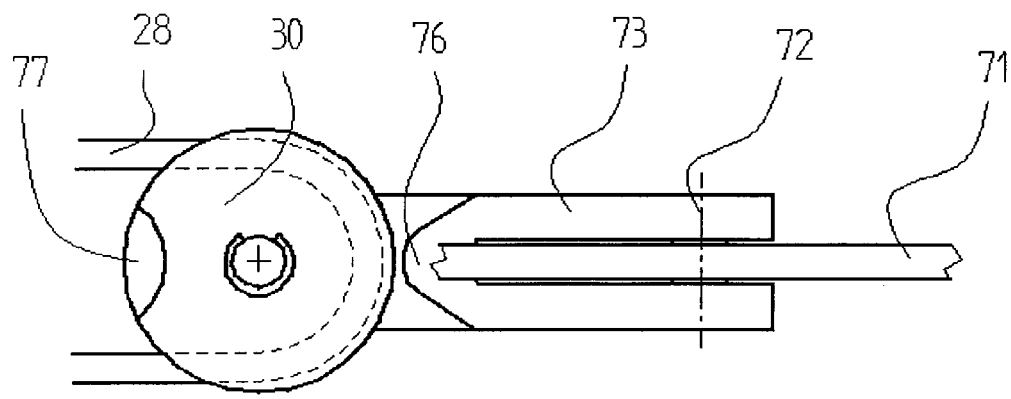
Figure 18A:
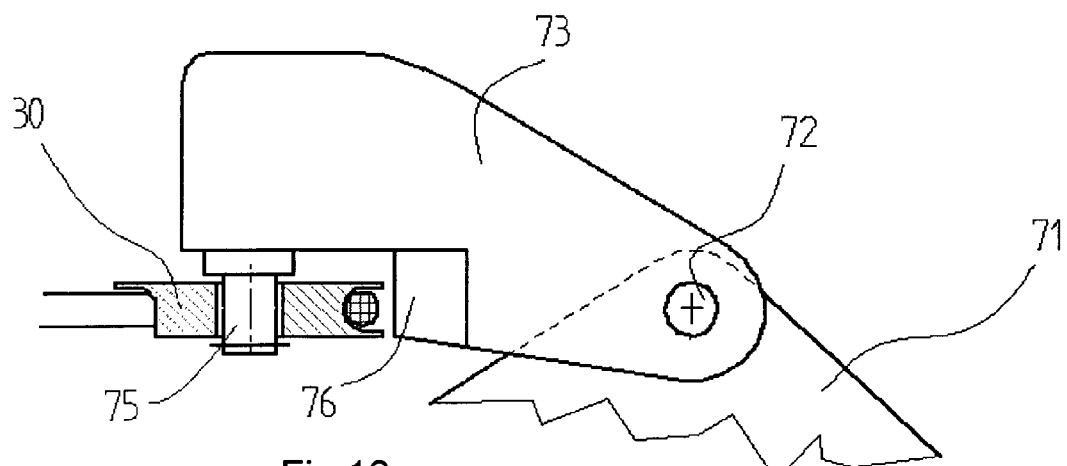

FIG. 7 shows the simplified sketch of the drive of the rear wheel 2 of the bicycle starting from the rope wheels 26a, 26b at the left side. Because the drive according to the invention can be found equally at either side of the bicycle the sketch of FIG. 7 is also applicable to the drive at the other side but the momentary positions at the left and right sides are always opposite. Around the shaft 3 of the rear wheel 2 a rope drum 61 is arranged, which is also shown in FIG. 2. Both ends 29a and 29b of rope 28 are attached to the rope drum 61. The rope 38 is exposed only to pulling load. In the interior of the rope drum 61 a spiral spring 33 is arranged that keeps the rope 28 always in biased position and ensures the return movement of the swinging system. At the other side of the bicycle a similar assembly can be found which has rope drum 61'. At the rope ends 29a and 29b a predetermined number of turns are wound around the drum 61 to form respective windings. When the bicycle is driven, the number of turns is changing because the rope is cyclically wound up and down. The highest number of the turns is around 4 or 5. The sense of the two neighboring windings is opposite, therefore any angular displacement of the rope drum 61 is associated with the same amount of displacement of the rope branches 28a, 28b leaving the respective windings. The lateral component of the rope displacement is symmetric relative to the central plane of the two windings, which means that the acting line of the resulting force obtained from the forces of the two rope branches 28a, 28b will always fall in the central plane, being the plane in half way between the rope wheels 26a and 26b. The two rope branches 28a and 28b are lead around the associated rope wheels 26a, 26b then they continue their paths in rearward direction to get united at a balance wheel 30. The balance wheel 30 has a bearing with a vertical shaft held by a pivoted support member 31 attached to a central region of the rear fork. The pivoted clamping of the support member 31 ensures that the plane of the balance wheel 30 fall always in the plane of the ropes leaving the rope wheels 26a, b always in tangential direction, thus only such tangential pulling forces can act on the balance wheel 30. The pivoted support member 30 can be also be designed as shown in FIGS. 18a, b and c that provides for a fast and comfortable disengagement of the driving rope. In this design a lug 71 is welded to the central section of the rear fork of the bicycle that holds a shaft 72, and a rocker arm 73 is pivoted around the shaft 72 to hold a stationary shaft 75. The balance wheel 30 is pivoted and fixed by the stationary shaft 75 with a small play. At a flange of the balance wheel 30 a recess 77 is provided. The rocker arm 73 comprises a projection 76 that protrudes towards the flanges of the balance wheel 30. The driving rope 28 surrounds the balance wheel 30 and during the driving operation of the bicycle the rope 28 has only at most a small displacement. Normally, the recess 77 faces in rearward direction as shown in FIG. 18b, and the projection 76 prevents the driving rope 28 (when getting in a loose state) from disengaging the balance wheel 30 either accidentally or when the rope 28 is pulled. FIG. 18c shows the balance wheel 30 when being turned by a half revolution relative to the position shown in FIG. 18b, which position can be used for the intentional disengagement of the rope 28. The spacing formed between the projection 76 and the edge of the recess 77 is greater than the diameter of the rope 28, and the rope 28 can be disengaged and removed if the rope 28 is first pulled against the biasing force of spiral spring 33 (positioned in the rope drum 61) and disengaged from the rope wheels 26a, b, then moved out through this spacing formed between the projection 76 and the recess 77, and finally wound down from the rope drum 61.

Owing to the fact that in lateral direction the two rope wheels 26 a and b are arranged symmetrically at both sides of the traction arm 17 of the swinging arm 10, the forces acting on the respective rope branches 28a and b will always act symmetrically on the traction arm 17, therefore only forces falling in the plane of the traction arm 17 i.e. in the vertical plane can be generated, and no lateral force or torque can thus arise. This symmetry is provided by the opposite sense of the wounding of the rope branches on the rope drum 61, whereby the lateral component of the rope branches leaving or returning to the windings is always symmetrical to the plane of the swinging arm 10. The position of the pivoted support member 31 should be chosen in such a way that the axis of the balance wheel 31 fall in the central plane of the swinging arm 10.

The rope path shown in FIG. 7 can ensure not only the symmetry by which the load will always act in the central plane of the swinging arm but also the even distribution of the load among the rope branches. When the swinging arm 10 is reciprocating forward and backwards around the centre of rotation 23, the rope 28 will be reciprocating in the mutual tangential plane defined by that of the rope drum 61 and of the two rope wheels 26 a and b as shown by the double arrow 32 in FIG. 7. In the system shown it is true that any unity displacement of the common shaft of the two rope wheels 26a and b that takes place in the direction of the rope 28 will cause twice of that unity displacement by the perimeter of the rope drum 61. When the traction path 19 of the swinging arm 10 exerts a force F on the common shaft of the two wheel drums 26a and b, then in the individual rope branches 28a and 28b only a force of F/4 will appear. The rope 28 can be realized preferable by a multi filament spun plastic material of high density material e.g. of polyamide fibers, such as used widely in sailing applications, wherein the rope should have a diameter between about 2 and 3.5 mm and preferably between 2.5 and 3 mm that has a high strength, small expansion and which can be repeatedly and extensively bent. The decrease of the rope branch forces to the quarter of the total force, the required rope diameter could also be decreased. The bending property of ropes, more particularly the bending radius and the cycle number improves with the decrease of the diameter, therefore the use of ropes with smaller radius increases the bending properties. The diameter of the rope wheels 26a and b should be chosen to adapt to the bending radius of the rope at the given load, and in the exemplary case when a rope diameter of 4 mm is chosen, a wheel diameter of 30-40 mm is sufficient. The diameter of the rope drum 61 is affected by the bending diameter of the rope (it creates a lower diameter limit), but it is also dependent on the transmission ratio to be realized and on a few other considerations. With the described size and diameter data an endurance test has been carried out on a test bank that created normal load, and the rope 28 has remained uninjured and loadable after a test run of 15.000 km, although the rope was exposed to a substantial bending load since in each swinging period the rope was once wound up and down the rope drum.

The balance wheel 30 has the task of ensuring identical load in the respective rope branches. Especially, when a sudden load takes place, owing to the resilience of the rope the branch which is exposed to a higher pulling force would be exposed to a higher load, however, owing to the force difference, the balance wheel 30 can slightly turn around and this balances the load among the two rope branches.

It is apparent that when during the rotation of the driving shafts the driving wheels 15, 15' rotate along respective circular paths, then the driving arms 16, 16' can be forced only by the forward forces acting on the driving paths 18, 18', therefore when the driving wheels 15, 15' move rearwards, then special measures should be made to reverse the swinging direction of the swinging arms 10, 10' and that the driving arm 16, 16' can follow the rearward motion of the driving wheels 15, 15'. Although there are several ways how this rearward motion can be provided, in the exemplary embodiments this motion is provided by the spiral spring 33 shown only schematically in FIG. 7, and which is arranged in the hollow interior of the rope drum 61 and which is wound up and get biased when the rope drum 61 is rotated in forward direction and energy is stored therein, and this biasing force exerts a rearward pulling or biasing force on the traction path 19 being between about 20 and 50 Newton, and when the swinging arms 10, 10' being left alone, this biasing force moves the swinging arms 10, 10' backwards. The appropriate design of the spiral spring 33 ensures that the rope 28 be sufficiently biased even under no load condition but the biasing force be not too high when the swinging arm 10 or 10' is in its extreme forward position. The periodic winding up and down of the spiral spring 33 brings about no real energy loss, since the energy stored therein will largely utilized during the winding down phases. This kind of rope biasing has, however, an interesting consequence, namely the system strives to take the minimum energy state when being under no load. Unlike to conventional bicycles where the pedals will store the position where the cyclist left them when he left the bike, in our case after leaving the bike the biasing force moves the pedals always in the same position either on the left or right sides depending on whether at the leaving moment the left or right pedals were in lower position. With the proper design of the parameters of the system it can be attained that this initial pedal position take an optimum angle (around 8 or 9 o'clock) for mounting the bike when the pedal is in forward and high position at the side where the cyclist wishes to mount.

In connection with the drive described so far a short reference will be made again to FIG. 3 which shows that the rope wheels 26a, b and 26 a', b' are in the central portion of the traction path 19, 19'. The change of the transmission ratio can be provided by sliding the rope wheels up and down along the traction path 19, 19'. If this sliding movement is taken into account, then in the driving sketch of FIG. 7 this movement is indicted by the displacement of the axis of rotation 27 of the rope wheels 26a, b along the traction path. This path is visualized in FIG. 7 by the double arrow 34 that represents the displacement that takes place because of the change of the transmission ratio. At the same time, during the swinging movement the same axis of rotation 27 will also reciprocate along the curved arrow 34a. The direction of this reciprocating movement will not remain the same at different values of the transmission ration. The present driving system will, however, not be noticeably affected by this circumstance because the axis of the balance wheel 30 can always follows this angular movement, since this axis can change its angle of inclination as the support member 31 is pivoted.

It should be noted that the swinging movement of the traction arm 17 can be transmitted in several other ways to the rope drum on the rear wheel, e.g. when a sufficiently strong rope is chosen instead of dividing the rope into four branches two branch could also be functional. In such a case a single rope wheel has to be placed in the plane of the swinging arm and it should be prevented that during the winding of the rope up and down the drum an unwanted critical lateral component can act on the swinging arm. Similarly, several other ways can be used to keep the rope biased and be pulled back, however, the design shown has the described advantages (e.g. the decrease of the load acting on the individual rope branches, the balancing of the branch forces, the increase of flexibility by using a thinner rope and finally the fact that the resulting rope forces always fall in the central plane of the swinging arm 10).

Figure 8:
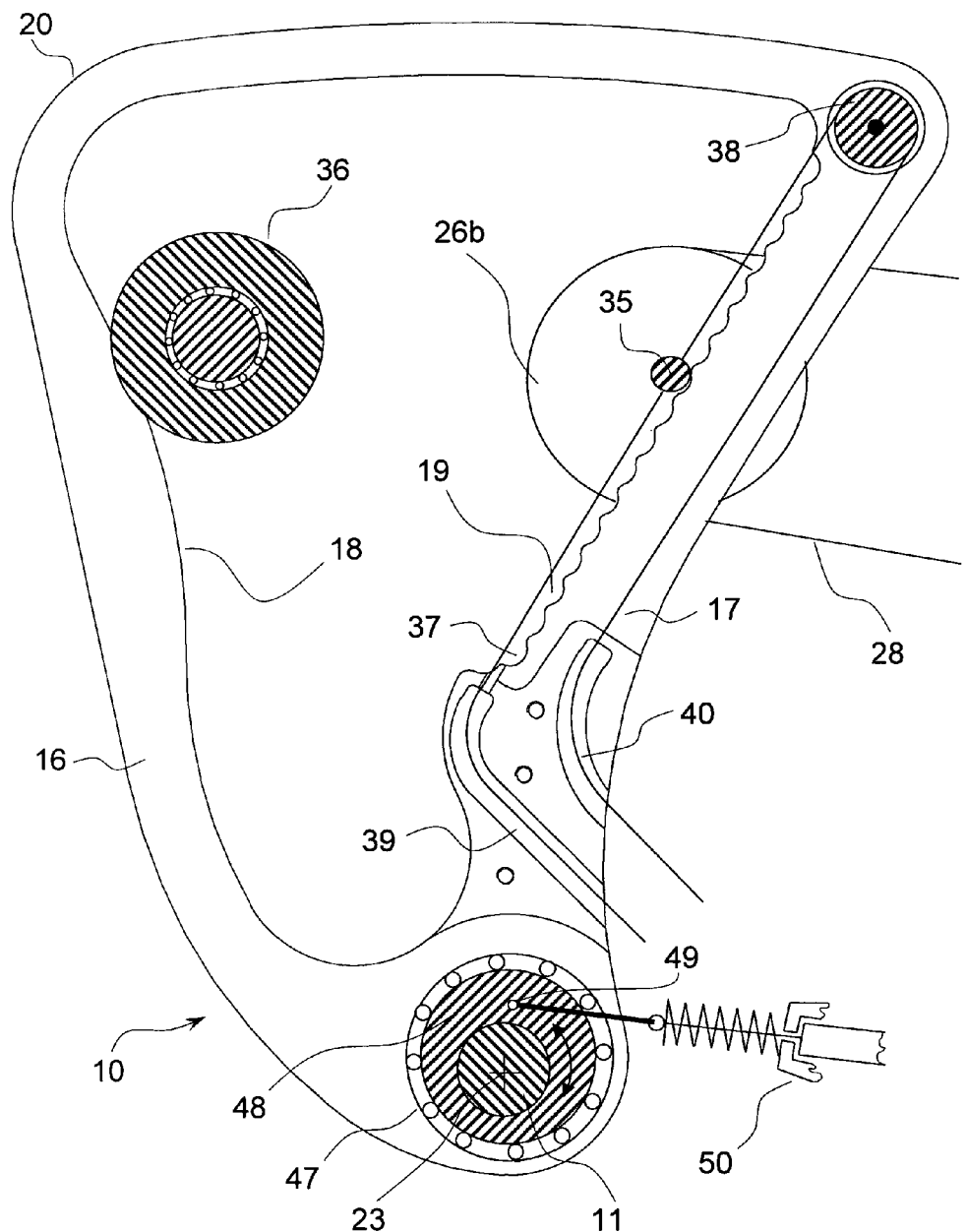
FIG. 8 is a sketch showing the design of the swinging arm, the positioning of the rope wheels and the assembly for changing the transmission ratio.

Reference is made now to FIG. 8 which illustrates (among other designs) the way how the transmission ratio can be varied. The figure shows the swinging arm 10 that consists of two plates in a sectional view taken in the central plane of the gap between the plates, and for the sake of better identification the reference numerals of the main components are also indicated. For the adjustment of the required transmission ratio (gear) it is important to understand how the position of the rope wheels 26a and b is changed along the traction path 19 defined in the frontal edge of the traction arm 17. FIG. 8 shows the rope wheel 26b and in section the shaft 35 can be seen that connects the rope wheel 26b with the other rope wheel 26b which is above the plane of the drawing an therefore it cannot be seen. The rope wheels 26a and b can freely rotate around the shaft 35 which rotation is made possible by ball bearings 52 and 52b shown in the sectional view of FIG. 16. In the embodiment shown in FIG. 8 the surface of the traction path 19 is provided by a series of discrete and arced recesses 37 which have the task of temporarily fixing the position of the shaft 35 by creating a fitting engagement between the shaft 35 and a portion of a conforming recess. At the upper end portion of the traction arm 17 which is close to the connection arm 20 a rope wheel 38 is arranged which has a sufficiently small width to be placed in the narrow gap between the two swinging arm pieces 21a and 21b (see FIG. 16) and its shaft is fixed in respective opposite bores made in the swinging arm pieces. In the embodiment shown in FIG. 8 respective guiding channels are provided in the lower portion of the traction arm 17 for accommodating respective Bowden wires 39 and 40. The outer mantle of the Bowden wire 39 is fixed deeply in the associated channel under the lower end of the traction path 19 and the inner wire is lead and attached to the shaft 35. The mantle of the other Bowden wire 40 is also fixed in the other channel and its inner wire is extending out along the gap between the two swinging arm pieces 21a, 21b and it is lead around the rope wheel 38 then its path continues downwardly till the shaft 35 where it is fixed. When the wire 39 is pulled and the other wire 40 is allowed to follow the pulling motion, then a pulling force showing in the direction of the traction path will act on the shaft 35 that will force it to move together with the two attached rope wheels 26a and 26b in inward direction i.e. towards the centre of rotation 23. In the opposite case, when the wire 40 is pulled and the other wire 39 is allowed to follow, then an opposite force will act on the shaft 35 which falls also in the direction of the traction path 19 and strives to move the shaft 35 outward towards the rope wheel 38.

However, the rope wheels 26a and 26b can move along the traction path 19 only when the swinging arm 10 and therewith its traction arm 17 is swinging in backward direction, i.e. when the engagement force between the shaft 35 and the associated recess 37 in the traction path 19 is comparatively low as it is provided only by the biasing force of the rope 38. In such circumstances the force acting in the direction of the traction path 19 is sufficient to move the shaft 35 out of the corresponding recess 37 and to move one step forward and snap in the next one of the series of recesses, and when the pulling force is maintained, it continues to move in a step by step sliding movement as long as the wire is kept pulled. A free and easy rolling of the shaft 35 is facilitated if the wires 39 and 40 are attached thereto by means of a bearing 53 as shown in FIG. 16. The profile of the recesses 37 (especially their rising upper sections) are rounded, and the heights (or depth) of the recesses 37 are chosen such a way just to ensure that during the swinging movement the shaft 35 can retain its position along the traction path 19 in spite of the ever changing forces acting thereon, wherein the intensity of the forces is fluctuating in a substantial extent, and the direction of these forces is also changing but within smaller ranges. A displacement along the traction path 19 which also acts as a gear-changing path is made possible only if the shaft 35 is pressed in the momentary recess only by the relatively small force derived from the biasing tension of the rope. This condition can be fulfilled in several occasions. The first of these conditions is the rearward swinging movement of the swinging arm which takes place once in either side of the bicycle at every full revolution of the driving shaft 4. A further such condition takes place when the bicycle is staying (not moving) or the rider does not turn the driving shaft (pedals). When the rider drives the bike with force, then the traction arm 17 of the momentarily active swinging arm is turned in forward direction, and the force of this forward displacement pushes the shaft 35 to the corresponding recess 37, and under such conditions the sliding force that can be exerted by the wires 39 or 40 is insufficient to disengage the fitting connection between the recess 37 and the shaft 35 pressed therein.

Figure 9:
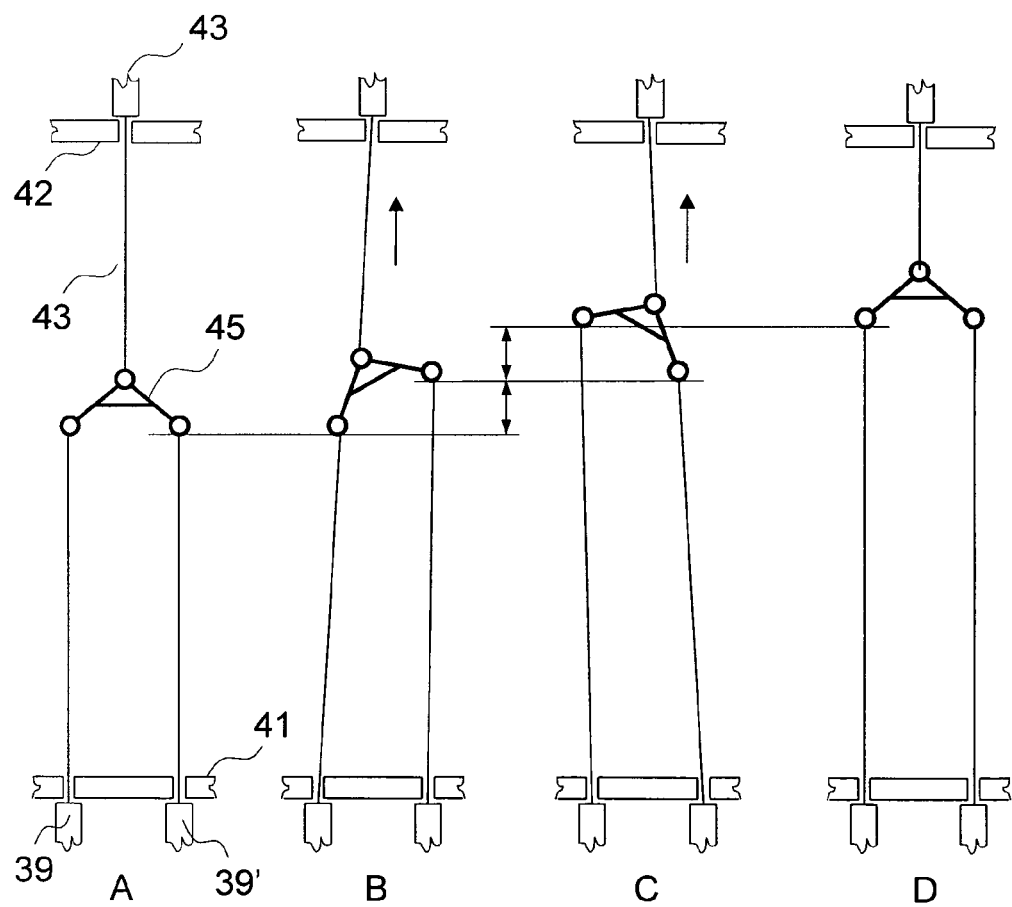
FIG. 9 is a sketch illustrating the path of the Bowden wires controlling the changing of the transmission ratio.

The design according to the invention enables the changing of the transmission ratio (gears) in case the bike is just being driven with substantial forces. This will be explained by referring to FIG. 9. As explained, two Bowden wires 39, 40 are lead to the swinging arm 10 on the left side of the bicycle. In the perspective view of FIG. 2 it can be observed that the frame 1 has a rear, almost vertical rod, and this rod holds a lower support member 41 and an upper support member 42 which extend out horizontally in rearward direction from the rod and they are spaced by a predetermined distance. The lower support member 41 holds the upper ends of the Bowden wires 39, 39' and 40, 40' which lead to the left and rear swinging arms 10, 10', respectively. The upper support member 42 receives only the lower ends of two further Bowden wires 43 and 44. The other ends of the wires 43, 44 are lead and coupled to handle grip speed changer mechanism arranged on the handler bar of the bicycle, which is not explained in the present specification. When the speed changer mechanism is turned in the first direction, a pulling force acts on the Bowden wire 43 and the other wire 44 is released by the same extent, and when the direction of the turning movement is changed, the roles of the wires 43 and 44 will be interchanged. FIG. 9 illustrates only the situation at one of these two possible displacements, when a pulling force is applied on the wire 43 attached to the upper support member 43 relative to the initial stable position (sketch A initial, sketches B and C pulled states). When under the effect of the pulling force the rope wheels 26a, 6b have got displaced along the traction path 19, the wire 43 is left in the new position (sketch D). The wire 43 is connected to a central part of a two armed rock lever 45, and the ends of the two arms are connected to the upper end of the wire 39 that comes from the swinging arm 10 at the left side of the bike, and to the upper end of the wire 39' that comes from the swinging arm 10' at the right side of the bike, respectively. It is not shown in FIG. 9 that the other Bowden wire 44 of the speed changer mechanism is coupled by means of a further identical rock lever to the respective ends of the wires 40 and 40'. In operation, all these Bowden wires are under a predetermined biased condition.

Sketch A of FIG. 9 shows the initial position when in the left and right sides the two shafts 35 and 35' engage respective corresponding recesses 37, 37' of their traction paths 19, 19'. Let us assume that the cyclist rides uphill on a slope and wishes to increase the transmission ratio, i.e. he intends to produce a smaller angular displacement of the driven wheel for a given turning of the pedals. By turning the speed changing mechanism on the grip in the appropriate direction, the wire 43 will be pulled and this will pull the centre point of the rock lever 45 in upward direction. The left swinging arm 10 is then in a stressed condition since it moves forward under the effect of the driving of the bike, and in this tensed forward movement the shaft 35 is pressed in the corresponding recess 37. This tension between the shaft 35 and the recess 37 does not allow the shaft 35 to move along the traction path in spite of the pulling force applied on the wire 39, and there will be no displacement in the left side. While the left swinging arm 10 moves forward and pulls the rope, when the direction of the swinging movement of the other swinging arm 10' in the right side is reversed, this swinging arm 10' will be pulled back under the biasing effect of the rope branch 38'. The intensity of this biasing force is by orders of magnitude smaller than the pulling force under full load, therefore the upwardly directed pulling force acting on the rock lever 45 can now move the right lever arm in upward direction i.e. the wire 39' that leads to the right swinging arm 10' will move upward. The pulling force of this wire 39' at the right side can slide the right shaft 35' out of its corresponding recess 37' and it will move this shaft along the traction path 19' downward by one or two steps, whereby the rock lever 45 will take the asymmetric position as illustrated in sketch B of FIG. 9. The wire 43 is still under a biasing force. When the bike is driven forward, the roles and the directions of movement of the swinging arms 10 and 10' will soon change again and when the shaft 35' at the right side engages the corresponding new recess 37' then the driving force will temporarily fix this new position which is closer to the centre of rotation 23. Then the other swinging arm 10 at the left side will start to move backward and the shaft 35 can disengage from the associated recess 37 and slide in downward direction, and the positions will be as shown in sketch C of FIG. 9 and the left shaft will get closer to the centre of rotation. The final (rest) position shown in sketch D is reached when the rider is already satisfied with the momentary transmission ratio and will not turn and bias the wire 43 anymore. The rider will not really sense that the change of the transmission ratio has been attained in discrete steps, because when the load is transferred to a given new side, the position of the corresponding shaft has already been changed, and when the load will be shifted to the other side then that other side is also in a newer position. When the grip speed changer is turned in the other direction, just an opposite situation will be created, and the shafts 35, 35' will slide away from the centre of rotation i.e. in upward direction. In the described manner the change of speed can be effected even under loaded conditions e.g. when the bike is driven uphill, since in the alternating unloaded sides the sliding of the shafts can be carried out. Similarly, the change of speed can be effected when the bike is stationary or unloaded, and under no load conditions the change of speed does not require the turning of the pedals either.

The way how the wires 39, 40 are actually lead in the swinging arm 10 has been so far not been illustrated in detail, but it is obvious that the wires should reach the swinging arm 10 with minimum or slight changes in direction, no sudden break should take place, and a correct wire arrangement is shown in FIG. 16. Reference is made now to FIG. 16 which shows a preferable way how the Bowden wire 39 is lead between the rock lever 45 and the swinging arm 10. In order that the Bowden wire 39 cannot break or be exposed to unwanted bending loads owing to the uninterrupted alternating swinging movement of the swinging arm 10, it is preferable to lead the wire 39 in an arced path with a greater radius to the swinging arm 10, as shown from the inner side. From this aspect it is preferable that the swinging arm 10 comprises a pair of spaced swinging arm pieces 21a, 21b as explained earlier, because the wire 39 (and the other wire 40 not shown in this figure) can be lead in the gap defined between the pieces. For receiving the Bowden wires 39, 40, appropriate channels or nests can be provided in the swinging arm as illustrated in FIG. 8, wherein one of the wires is coupled directly and the other one through the rope wheel 38 to the shaft 35. Compared to the design of FIG. 8 the leading of the wires from a direction substantially normal to the swinging arm as shown in FIG. 16 is more preferred that allows a U-shaped wire leading, wherein the two arms of the U shape can be angularly tilted from each other. In connection with FIG. 9 it has been explained that the alternating change of speed requires certain bias in the two wires 39, 40. In many instances this resilient bias is a natural property of long Bowden wires, but this property can be increased by creating a special, longitudinally resilient mantle for the Bowden wires in the comparatively short section between the lower support member 41 and their receiving insertion channel in the swinging arm 10 so that the mechanical tension of mantle can be adjusted or spring loaded. To this purpose the Bowden wire 39 has a mantle 54 made by a coil spring. Further details how the transmission ratio is changed and adjusted will be dealt with in a different part of the present specification.

From the point of view of the operation of the alternating drive with swinging arms according to the invention it has an outstanding significance how and according to what characteristic curve the turning of the driving arms 5, 6 results in the rotation of the rear wheel 2. From FIG. 1 it can be seen that during the driving motion the driving arms 5, 6 rotate along a circular path defined around the driving shaft 4 as an axis of rotation, and in the left and right sides the respective driving wheels 15 and 15' also rotate around the same axis. These rotating driving wheels 15, 15' are rolling along the rear edges of the driving arms 16, 16' of the swinging arms 10, 10', and these edges form the respective driving paths 18, 18', and as a result of this forced motion the swinging arms 10, 10' follow a reciprocating swinging movement around the centre of rotation 23. The kinematic sketches of FIGS. 10*a* to 10*g* illustrate the special and characteristic positions of this swinging movement.

Figure 10:
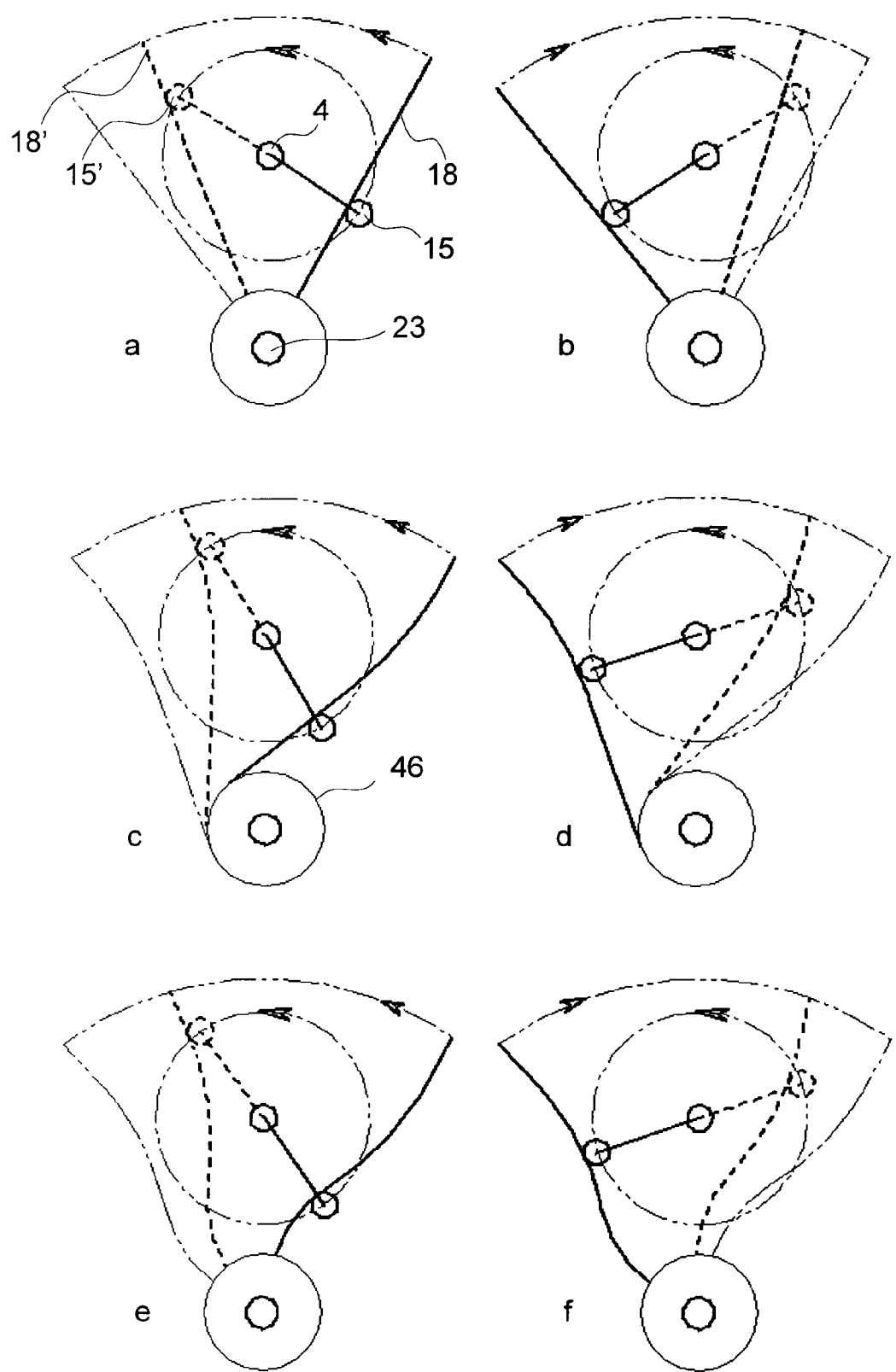
FIG. 10 shows kinematic sketches illustrating the drive in case of different driving paths and in different positions of the swinging motion.

The sketches of FIG. 10 shown only those elements which have a role in the kinematics of the motion, therefore the driving path 18 is shown and schematically the driving wheel 15 with a centre that falls in the axis of the driving shaft 4, and the centre of rotation 23 of the swinging movement has also been shown. The driving path 18 on the left side of the bicycle has been drawn with a full line, and the driving path 18' on the opposite right side is shown by dashed line. At the upper portion of the sketches the double dot dashed line shows the momentary direction of the movement of the driving path 18 drawn by full line and which path 18 is connected to the swinging arm 10. In the sketches respective circular paths are shown by dot-dash line which is the path of movement of the centre point of the driving wheel 15. The direction of rotation is counter-clockwise here. The same direction of rotation is applicable to the driving path on the right side if it is illustrated by a projection from the left side.

Sketches 10*a* and 10*b* relate to prior art solutions, wherein the driving path 18 is linear and its extension crosses the centre of rotation 23 of the swinging movement. In sketch 10*a* the driving wheel 15 is in the extreme rear (in the sketch extreme right) position of its swinging movement, and previously the movement has taken place from left to right, and following the position shown, the direction of movement gets reversed, and the driving wheel 15 moves the driving path 18 in counter clockwise direction which is a forward movement. At the same time the driving path 18' on the other side of the bicycle still moves in the same (forward) direction and has not yet reached its extreme position when its direction of swinging movement is reversed. Although the angular speed of both driving wheels 15 and 15' is the same, this condition is not true for the angular speed of the swinging movement of the driving paths 18 and 18'. Because the driving path 18 is at the extreme position of its swinging movement, its angular speed is just zero and the direction of its movement just reverses. Thereafter an angular acceleration takes place and the angular speed increases. On the other side the angular speed of the driving path 18' is still positive but it is slowly decelerating.

With regard to the fact that at the rear shaft of the rear wheel 2 of the bicycle there are respective rope drums which are coupled to respective free wheels, of the two free wheels always that one will be locked (i.e. in driving state) which has a higher angular speed in forward direction, since the rear shaft cannot have two speeds at a time. From this it can be understood that under the conditions shown in FIG. 10*a* the right driving path 18' drawn by dashed line has a higher forward angular speed, therefore the system on the right side is driving and the system on the left side cannot yet drive. Thereafter the angular speed of the swinging movement of the right driving path 18' drawn by the dashed line is decreasing and that on the left side is increasing. The system will soon reach the point when the momentary angular speeds of the decelerating and accelerating sides become equal, and thereafter the roles will be changed, and the driving task will be shifted to the system on the left side.

Sketch 10*b* shows the position in which the left driving path 18 has reached the other extreme swinging position, then its angular speed is zero, and thereafter it will turn rearward (i.e. from left to right i.e. backwards). In this position the right driving path 18' shown by the dashed line moves again in forward direction, and its angular speed is just as high with the same direction as shown in the sketch 10*a*, but then it was a decelerating movement and now it is accelerating. When the sketches 10*a* and 10*b* are compared, it can be seen that when at one side the extreme position of the driving path is reached, then the other side already moves in forward direction, thus the driving portions of the swinging movements on the two sides are overlapping each other, therefore the driving is continuous. The decelerating movement of the driving arm at one side will take place just when on the other side there is an acceleration from which it will necessarily follow that in the decelerating/accelerating section there will always be a point where the angular speeds of the swinging motions are identical. In these points or sections the driving will be smoothly i.e. unnoticeably shifted from one side to the other one. In the following it will be explained that this theoretically smooth shift requires a slight jump in steepness at the meeting sections of the curves that change each other in order that an actually smooth transition can take place when the flexible expansion of the rope under the effect of the load is also taken into account.

Sketches 10*c* and 10*d* show similar positions but in these cases the shapes of the driving paths 18 and 18' have been changed. The change has resulted in that in the path shown in sketch 10*c*, in the rear extreme position of the swinging movement the tangent line drawn to the driving path will not cross the center of rotation 23 any more but it is offset by a predetermined distance from the centre. This tangent point falls in different positions during the swinging movement, the sketch 10*c* shows a circle path 46 along which this tangent point moves. During the swinging movement the distance between the tangent line and the centre of rotation 23 is always the same. The other difference lies in that the driving paths 18 and 18' have arced shapes, the arced section is convex upwards from the extreme position shown in sketch 10*c*, and this section has a slight curvature. The kinematical conditions basically correspond to those described in connection with FIGS. 10*a* and 10*b*, but the shapes of the characteristic curves is substantially different. The conditions would also be different from those of FIGS. 10*a* and *b* if the arced paths sections were replaced by such linear sections which would be that tangent line of the circle 46 which crosses the extreme position of the driving path.

In the sketches 10*c* and *d* it is also visible that the angular difference between the two extreme positions of the swinging movement has become greater, i.e. during a full rotation around the driving shaft 4 the driving path takes a wider angular range, which results in a greater transmission ratio between the driving shaft 4 and the rear wheel 2 if all other dimensions remain the same. The arced shape together with the angularly offset positioning of the driving path is the source of further substantial advantages which will be described in more detail.

In the sketches 10*e* and 10*f* the shape of the driving paths 18 and 18' has been further modified compared to the previously described arced design. Above the contact point that corresponds to the extreme right swinging position shown in sketch 10*e* the driving path has closely the same arced shape as it was described in connection with the sketches 10*c* and *d*. The modification lies in that below the contact point (i.e. in the direction of the centre of rotation 23) the nature of curvature is reversed which means that the convex curved line shifts to become concave and the curve will have an inflexion at the indicated contact point. The driving paths 18 or 18' has significance and sense in inward direction as long as it can get into contact with the driving wheel 15 or 15'. Thus the inner end of the driving paths 18 and 18' lies in where the distance between the centre of rotation and the circle drawn along the points of contact of the driving wheel 15, 15' is at its minimum. This short concave arced section has significance during the rearward swinging motion of the swinging arm, and its presence results in a smaller and less steeply changing angular speed, and it has an important role in the first active section of the swinging motion when the load is taken up by the incoming swinging arm.

Figure 11:
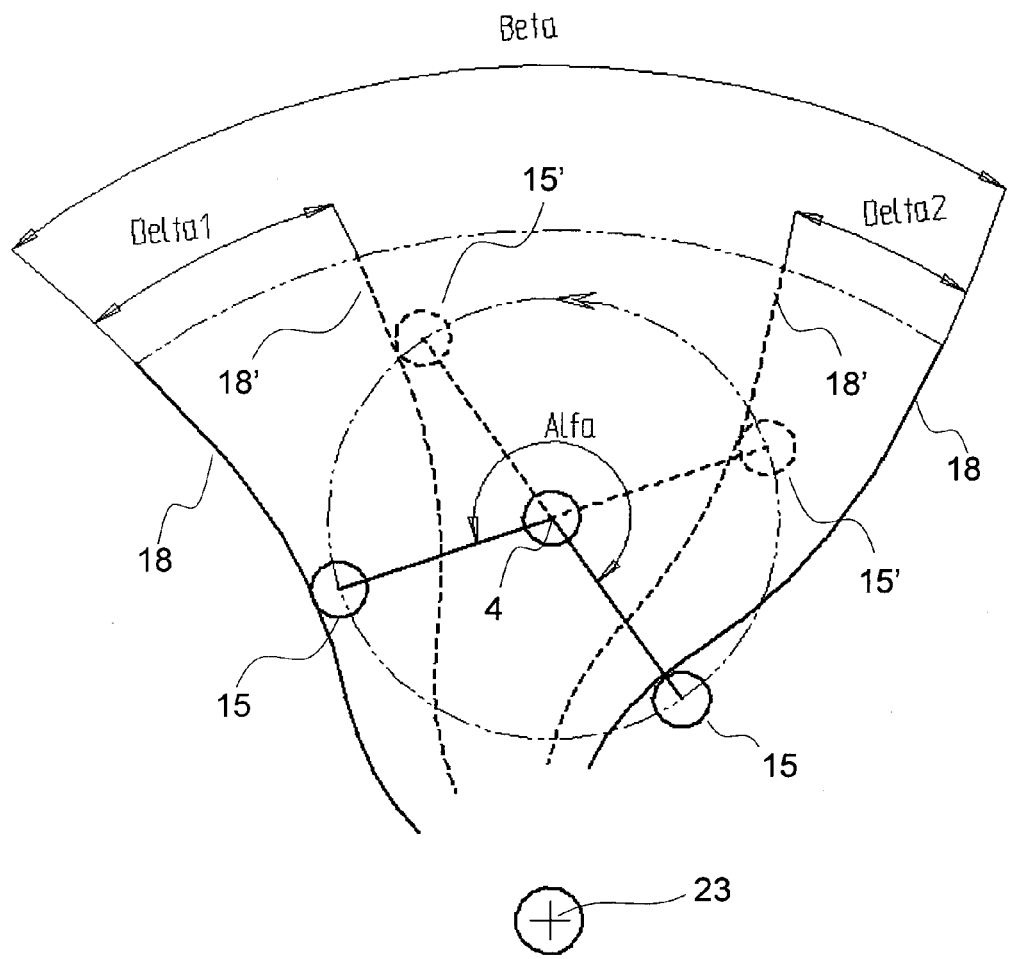
FIG. 11 shows the optimum driving path and its properties.

For providing a more detailed understanding reference is made to FIG. 11 that shows the characteristic properties of the driving path 18 and 18' that has the aforesaid inflexion. The figure shows the left driving path 18 in the two extreme positions of the swinging motion. At such positions in the left side the right driving path 18' and the right driving wheel 15' have been illustrated by the dashed line. When the driving shaft 4 is turned between these two extreme positions, its full angular range is Alpha and during that rotation section the driving path 18 swings (rotates) from the rearmost position forward i.e. in counterclockwise direction. When the driving shaft 4 takes this full angular range Alpha, the driving path 18 and together with it the swinging arm takes only and angular range Beta. When the left driving path 18 is in its rearmost position, then in the right side the driving path 18' is by an angular distance Delta1 behind its extreme forward position, thus during the time when this angular displacement Delta1 is taken, then the driving paths 18 and 18' in both sides are moving forward i.e. in the driving direction. When the left driving path 18 is at its foremost extreme position, then in the right side the driving wheel 15' is already by an angle Delta2 away (in forward direction) from its rearmost position. The angle Delta 1 (and the angle Delta 2 when seeing the conditions from the other side) designate the angular range in which the driving effect both in the left and rights sides takes place in forward direction, but in one side the angular movement is decelerating while in the other side it is accelerating, and there exists a narrow angular range in which the angular speeds at both sides are identical or substantially identical. This identity provides for the smooth transition of the driving task from one side to the other one and vice versa. It should be noted that from the point of view of the operation of the driving system according to the present invention it is indifferent whether the driving shaft 4 is rotated by foot through the two driving arms or the rotation is maintained by a motor, therefore it has no significance whether the source of driving comes from a human effort or from an engine.

Figure 12:
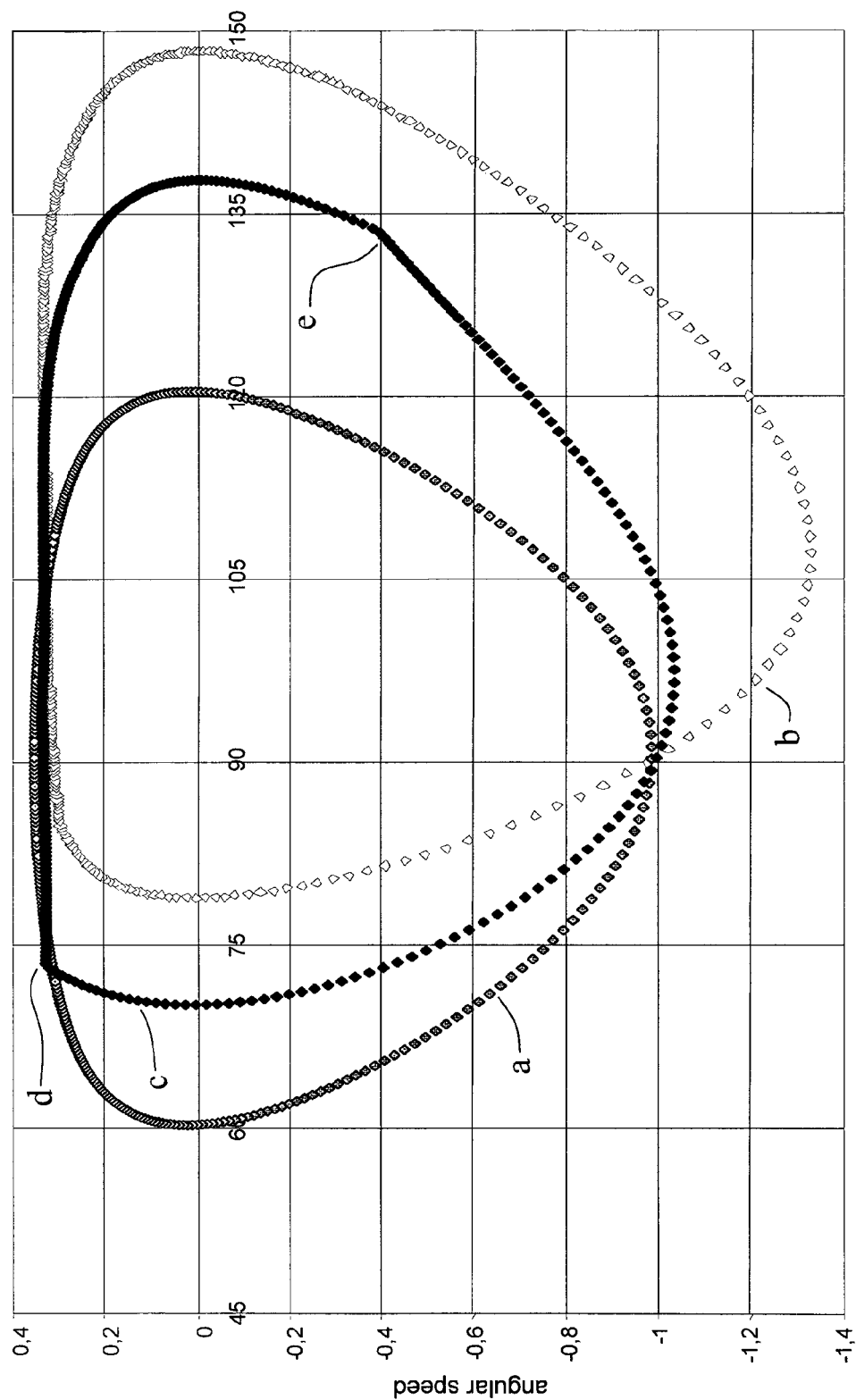
FIG. 12 shows diagrams illustrating the angular speed of the driving arm as a function of the angular position of the driving arm in case of three different driving path shapes.

The shape and positioning of the driving path 18 as shown in the three different sketches of FIG. 10 have a basic influence on the driving characteristics of the bicycle. Diagrams a, b and c in FIG. 12 show the dependence of the angular speed of the driving path 18 from the angular position of the swinging arm 10. In the diagrams positive angular speed values correspond to the counterclockwise direction of angular displacements which indicates motion from backwards to forward direction, while negative angular speeds are associated with the opposite, reverse angular motion when the swinging arm 10 is returning. Diagram a is derived from the linear driving path 18 shaped and positioned as shown in sketches 10a and 10b, wherein the line drawn to the path 18 crosses the centre of rotation 23. Diagram b corresponds to the arced driving path 18 shown in sketches 10c and 10d and finally diagram c corresponds to the driving path shown in sketches 10e and 10f, which has an "S" shape with inflexion. In case of diagram a the angular speed of the swinging motion is noticeably changing during the rotation of the driving shaft, which evokes in the rider a driving sensation (that might be unpleasant) which is substantially different from what has been customary in case of driving bikes equipped with conventional chain, because in conventional bikes driven by a circular chain wheel the angular speed of the driven rear wheel is the same at all angular positions of the driving shaft (pedal shaft). The full positive range corresponds only to a 60° angular range of the position of the swinging arm, and from this narrow angular range the section that can be utilized for driving is by about 10° smaller. The angular speed fluctuates within this narrow range between 0.38 and 0.22.

Diagram b of FIG. 12 show a substantially more balanced situation compared to diagram a, in the driving range the curve is substantially horizontal and it changes at the two extreme angular positions. The width of the positive swinging range is about 70° being noticeably wider than earlier. The negative section of the diagram shows rather high negative angular speeds i.e. the swinging arm accelerates to comparatively high speeds when it returns to the extreme backward positions.

Diagram c of FIG. 12 corresponds to the S shaped driving path with inflexion. Its positive section is more uniform and flat than diagram b was, its range is just as wide, a striking difference can be experienced, however, in the returning section because the maximum angular speed during returning is by about 40% smaller than before. A smaller speed in the returning path and the associated smaller negative accelerations substantially decrease the force requirements i.e. the returning of the swinging arm 10 can be attained by applying smaller spring forces. In the diagrams of FIG. 12 shows clearly the effects of the shape of the driving path 18 on the curves, but they do not show how the actual transmission ratio changes as a function of the angular position of the driving shaft, since the rear wheel is always driven by the side which has a higher angular speed than the opposite other side. In diagram c of FIG. 12 two special points d and e have been shown, of which point d falls in the driving section and this indicates the position when the task of driving is taken over from the driving system in the other side. There is a break on the curve at point d which has been created intentionally, because this can be the condition of a smooth take over of the driving task from one side to the other one when the effect of the flexible expansion of the driving. Rope is also taken into account. Because during a full revolution of the driving shaft the driving wheel 15 rolls twice along the driving path, once in the first and once in the other direction, there will be a point in the return path that corresponds to the point d, and that is point e. Here a small jump can be experienced in the angular speed which has no significance that could be sensed.

Figure 13:
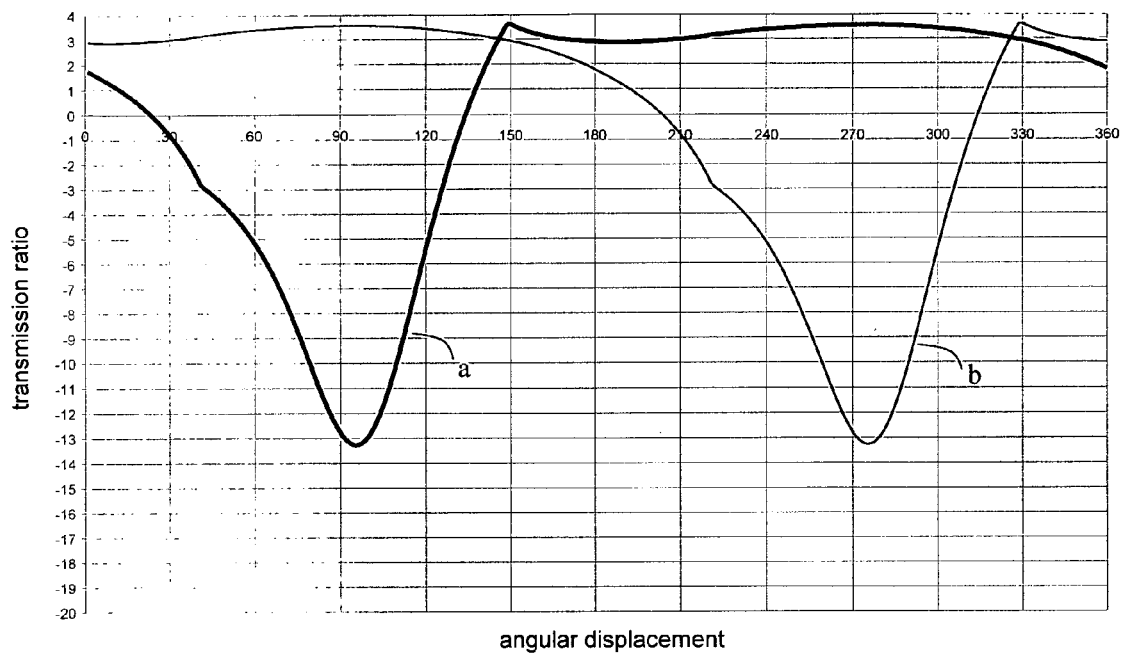
FIG. 13 shows the diagrams of the angular displacement versus transmission ratio of the left and right driving units without showing their inter actions.

Diagrams a and b of FIG. 13 show the transmission ration realized by the drive according to the invention as a function of the angular position of the driving shaft 4 in case the driving path 18 corresponds to the diagrams shown in sketches 10e and 10e and it has an inflexion and has a double arced shape. Diagram a of FIG. 13 is associated with the left swinging arm and diagram b with the right swinging arm. The term "transmission ratio" is the ratio of the angular speed of the rear wheel 2 to the angular speed of the driving shaft 4. This definition for the transmission ratio has a sense only when the given side actually drives the rear wheel, and values other than this (e.g. in the return path) are proportions that have no role in the driving task, and they can be interpreted as the ratio of the angular speed of the rear rope drum (that momentarily has no contribution to the driving task) and the angular speed of the driving shaft 4. In the diagrams of FIG. 13 it has not been taken into account that the respective sides drive the same wheel, and the transmission ratios of the respective sides have been depicted in the same coordinate system independent from each other without regard to the effects of the other side. It is interesting at these independent curves drawn in the same coordinate system that they cross each other around the driving shaft positions of 150° and 330°. Close to the crossing points the transmission ratio of the side that has driven before the crossing point is slightly decreasing and that of the other side increases rapidly and the two curves cross each other with a substantial steepness and the speed of the increasing side is rather high.

Figure 14:
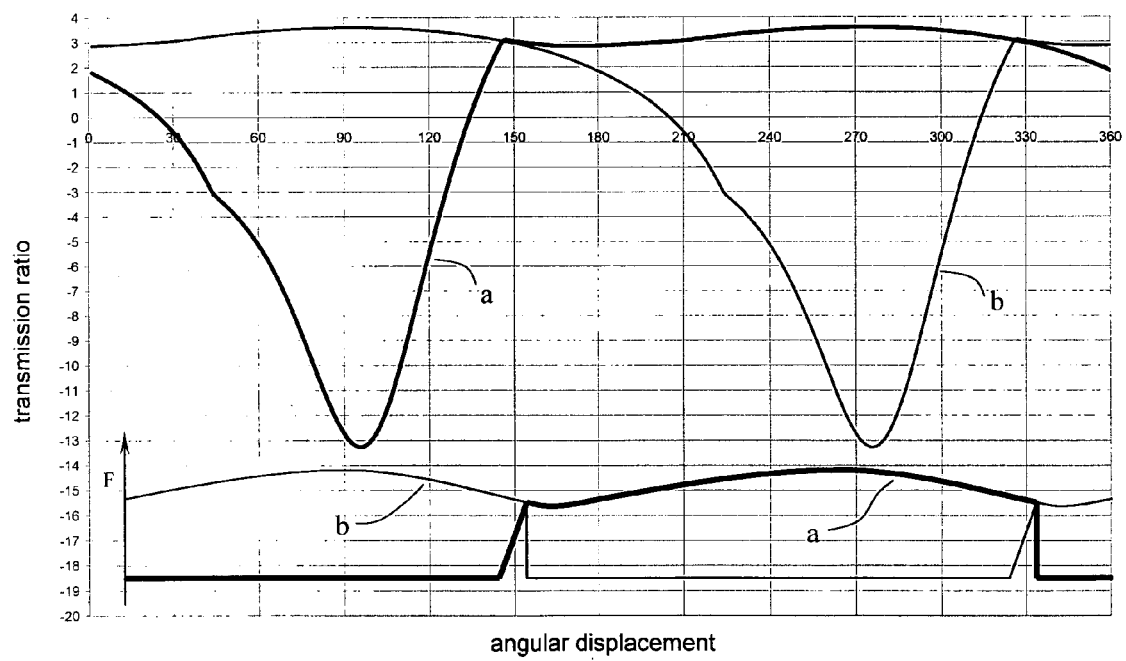
FIG. 14 shows diagrams similar to those of FIG. 13 also showing the inter actions of the two sides and the rope forces in the respective rope branches.

FIG. 14 differs from FIG. 13 in that here the actual cross effects have been taken into account where the left side influences the right side and vice versa, i.e. wherein the rear wheel is always driven by the side that has a higher angular speed. It has also been taken into account that when the pulling force increases, then the length of the rope will have a slight flexible increase. In the same coordinate system the rope forces Fa and Fb on the respective sides have also been shown. Force Fa was drawn by a heavier and force Fb with a thinner line. At the driving shaft position around 150° the side which accelerates in positive direction will get biased and will flexibly stretched out but on the other side the tension will decrease slowly and will suddenly disappear when the full force loads the other side corresponding to diagram a. The slight jump visible in FIG. 13 is required for the smooth transition of this force from one side to the other one, because this slight "jump" balances the delay caused by the flexible expansion of the rope. The diagrams are symmetric regarding the two sides i.e. in the range around 330° the shift takes place in the same way but in the other direction. When the flexible expansion of the rope is taken into account the curves a and b of FIG. 14 show a smooth shift without any sudden jump. The actual driving task is taken always by the upper one of the two curves. This driving curve is rather close to that what is customary in case of chain-driven bikes, and in the angular range where the transmission ratio is slightly decreasing, the rider feels as if the driving was "easier". With the appropriate design of the initial conditions, it can be provided that this "easier" range fall in the angular position of the pedals when they are in their uppermost and lowermost idle positions.

In FIGS. 13 and 14 the effects on the transmission ratio that come from the displacement of the traction arm 17 of the swinging arm and from the average position of the rope wheels 26*a* and 26*b* have also been taken into account.

Before describing these effects in more detail, reference will be made again to FIG. 8, in which a further feature of the present invention has been shown according to which the rider can modify the driving characteristic by intention. In the balanced driving curves shown in FIG. 14 it has been supposed that the axis 23 of the swinging motion of the swinging arms 18 and 18' fall in the centre of the swinging shaft 11. The embodiment shown in FIG. 8 makes it possible that the axis of the swinging motion be positioned away from the axis of the driving shaft 11. For that purpose in a central bore made in the central lower part of the swinging arm 10 a bearing 47 is fitted that has an inner ring in which a cam-disc 48 is inserted. The cam-disc 48 comprises a bore with an axis that is offset from the centre of the inner ring and this bore is pulled on the swinging shaft 11 and it is pivoted around it. A pin 49 is fixed to the cam-disc in a position offset from its bore that receives the end of a Bowden wire 50 that serves for the adjustment of the driving curve. The Bowden wire 50 can adjust the angular position of the cam-disc 48 on the swinging shaft 11, whereby the position of the actual centre of rotation (swinging movement) is changed that has an influence on the driving curve. The adjustment of the driving curve is a property of the drive according to the present invention which has not been known or possible in any of the conventional bicycle drives, therefore no experience has been collected about its effects. It can be assumed that during a monotonous driving session it is more entertaining or less boring if there exists a possibility for adjusting the driving curve, furthermore, different subjects might have differing preferences as to their favorite driving curve. For many riders it can be preferred if the pedals can be passed easier and faster through the upper- and lowermost idle positions (e.g. when driving uphill), and they can be satisfied if the extent of this effect can be adjusted. By adjusting the driving curve, one might influence how fast the muscles of the leg and feet get tired.

The embodiment shown in FIG. 8 is only one of the several ways how the driving curve can be adjusted, since several other adjustment means can be created that actually offsets the real centre of rotation from the axis of the swinging shaft 11.

Figure 15:
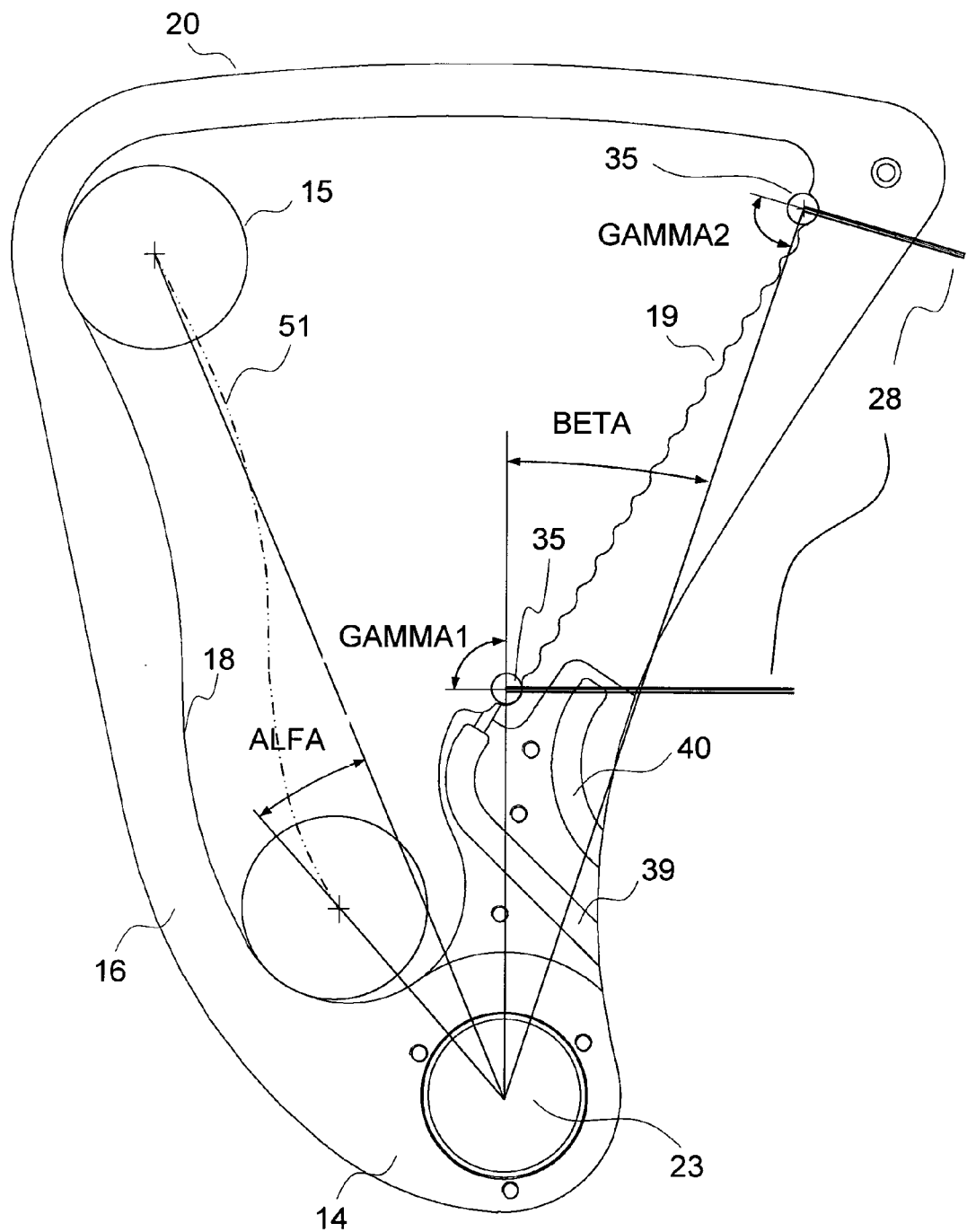
FIG. 15 shows a further embodiment of the swinging arm illustrating certain characteristic angles of the swinging arm.

Reference will be made now to FIG. 15 which, similarly to FIGS. 6 and 8 shown again the swinging arm 10, but emphasis will be made now on the way how the driving curve can be kept unchanged during the adjustment of the transmission ratio. The drawing shows only the elements required for understanding this property. The inner edge of the driving arm 16 of the swinging arm 10 constitutes the S-shaped driving path 18. The driving wheel 15 is shown in the two extreme positions of the driving path 18, and a dash-dot line shows a path 51 taken by the centre of the driving wheel 15. The centre of rotation 23 of the swinging arm 10 is connected with respective line sections with the centers of the driving wheel 15 in its two extreme positions, wherein these line sections close an angle ALFA which is between about 15° and 20°. During the alternating swinging motion each point of the swinging arm 10 swings around the center of rotation 23 and all such points take identical angular displacements. This condition is, however, not applicable on the driving wheel 15 because during the driving motion it rolls along the driving path 18, and during such movement the angular position of its centre will be different than the angular position of the swinging arm 10, and in the two extreme positions the relative angular difference will be ALFA. That difference renders the compensation of the driving curve possible in the driving side. The triangular inner opening of the swinging arm 10 provides space for the movement of the driving wheel 15, and provides also space for the traveling of the rope wheels 38 along the traction path 19. In FIG. 15 the shaft 35 that interconnects the rope wheels 38 can be seen in the two extreme positions of its path. In the embodiment shown the traction path 19 is a periodically recessed straight line, which is positioned by a predetermined distance offset from the center of rotation 23 and compared to the rear line section that forms the angle ALFA it is inclined backwards by about 40° to 50°. The straight line constituting the extension of the traction path 19 falls either in the centre of the driving wheel 15 when it is in its lowermost position, or there is only a slight distance between them and in any way this line is much closer to the centre of the driving wheel 15 than to the center of rotation 23. FIG. 15 also shows the connection lines between the center of rotation 23 and the centers of the shaft 35 in their two extreme positions, and these lines close an angle BETA with together. Theoretically this is the extent of the change of the angular position of the shaft 35 of the rope wheels during the changing of the transmission ratio, when illustrated in the coordinate system of the swinging arm 10. The full angular error will actually be smaller, because the rope 28 is directed in every momentary position of the rope wheels 38 to the tangent line of the rope drum, and this direction is changing when the rope wheels 38 travel along the traction path 19. With the respective section lines that constitute the angle BETA, in the innermost position (that corresponds to the smallest gear) the rope 28 closes and angle GAMMA1 and in the outermost position (that correspond to the highest gear) the rope 28 closes and angle GAMMA2. The angles GAMMA1 and GAMMA2 differ from each other at any position by about the same extent. The illustrated positioning and design of the traction path 19 decreases the angular error, and similar error-decreasing systems were used in the positioning and guiding of the pick-up arms of classic disc players in order that the needle can move tangentially to the guiding grooves both in the outer- and innermost tracks and its playing direction will be normal to the grooves.

With the design of the traction path 19 shown in FIG. 15 the driving curves explained earlier is true only in case of larger ranges of the transmission ratio, and in smaller transmission ratios the driving curve will get slightly distorted but the extent of distortion is so slight that most riders cannot even notice that in case of varying transmission ratios the curves are also changing.

As shown in FIG. 15, under the effect of the rope forces not only the magnitude of the force acting on the shaft 35 of the rope wheels 26*a* and 26*b* but also its direction is changing during the swinging motion, when examined in the coordinate system of the swinging arm 10. So far the conditions that influence the changing of the transmission ratio have been shown and explained when the unloaded shaft 19 is moved along the traction path 19. It is clear that the required displacement of the shaft 35 along the traction path will be easier to be made if the depth of the recesses 37 that fix the position of the shaft 35 is smaller. In the embodiments shown in FIGS. 8 and 15 the shape and the spacing between the receded 37 have been identical. The presence of the recesses 37 has the basic task to retain and keep the shaft 35 in the given position in the forward active sections of the swinging movement and to prevent that the components of the forces which act in the direction of the path can disengage the shaft and move it along the traction path. The stability of the positioning increases if the depth of the recesses 37 is increased. Such increased recess depths act namely against the easy disengagement of the shaft from the recess by lateral forces. The design will be at its optimum if in all possible positions of the shaft 35 the profile and depth of the recess 37 will be such that the component of the rope forces falling in the direction of the path remain just insufficient to move the shaft 35 out of its corresponding recess 37, whereas during the unloaded return movement of the swinging arm 10 or in other no-load conditions the intentional adjusting forces can overcome the retaining effect of the rope biasing forces and the shaft 35 can slide out of the momentary recess and move along the path to get engaged in the next recess.

In different positions of the traction path the direction of the forces acting on the shaft 35 will be different; therefore the conditions defining the shape and depth of the recesses 37 (i.e. to retain position when being loaded and can be moved under no load conditions) will vary along the path and it will require the use of recesses 37 with differing shapes and depths. With regard to these conditions instead of using the recesses 37 shown in FIGS. 8 and 15 with uniform depth and even spacing, recesses with varying depth and spacing should preferably be used in the traction path 19 as shown in FIG. 6. The recess 37*m* which is the farthest away from the centre of rotation 23 has the smallest depth and width, because here during the swinging motion the rope forces are closely normal to the line of the traction path 19 and the components of the rope forces falling in the path direction is very small.

In FIG. 6 a detail FIG. 6*b* is shown in the central opening of the swinging arm 10 that shows the shaft 35 and a corresponding section of the traction path 19 in an enlarged view. Here comparatively shallow and slightly asymmetric recesses can be seen.

FIG. 6*c* which is also an enlarged view like FIG. 6*b* shows a further preferred way of moving the rope wheels 26*a* and 26*b*. Here the shaft 35 of the rope wheels 26*a*, 26*b* is not coupled directly to the recesses 37 of the traction path 19 but the shaft 35 is lead through a boring defined in a sliding member 55 and pivoted therein. In the present case the traction path 19 comprises asymmetric teeth as recesses, wherein the shapes and spacing of the teeth are identical along the whole path 19 similar to those shown in FIGS. 8 and 15. The profile of the teeth is similar to those of a saw and their depth is smaller than the recesses shown in FIGS. 8 and 15. The teeth on the sliding member 55 and along the traction path 19 have substantially identical but complementing profiles. When the slide 55 is placed on the traction path 19, a temporary engagement takes place along a longer section of engagement i.e. not only the shaft 35 engages a single one of the recesses 37 as in the previous designs. The uniform profile and spacing for the teeth is required because the same slide member 55 moves along the whole traction path 19, and the slide member engages a plurality of recesses.

The fact that on either side of the bicycle there is a respective drive system, can provide a number of possibilities which cannot even be thought about in case of conventional chain-driven bikes. Such a possibility was e.g. that the driver could adjust the driving curve which was explained in connection with FIG. 8. A further basic difference comes from the fact that during the driving operation practically no twisting torque will act on the frame of the bike because the driving arms transmit the force in the plane of the driving wheel 15 which is fitted on the bolt 9 that connects the lateral shifting of the action plane of the force. The fact that the frame has been relieved from the twisting load creates a much lighter driving sensation. A further possibility comes from the fact that the left and right designs are symmetric, and there is a possibility for the adjustment of different transmission ratios in the left and right driving systems. Such asymmetry might be needed if the rider wishes to pay special attention or care to one of his feet or legs. The creation of different transmission ratios at the two sides is unusual, but a difference in the order of not more than 10% to 20% might already provide a sufficient relief for a leg that requires special care. Furthermore, the creation of a slight asymmetry might end up the monotonous and boring nature of the driving and might act against early tiring of the legs. A further advantage comes from the fact that there will be no need to design one side of the bike asymmetrically as it is required in conventional bikes because the drive is only at one side. The loadability of the rear wheel will be better if the spokes are arranged in a symmetrical way. As mentioned earlier, owing to the symmetrical design no twisting torque will act on the frame which need not be compensated by the muscular forces of the rider as it is the case in chain-driven bikes.

Figure 17:
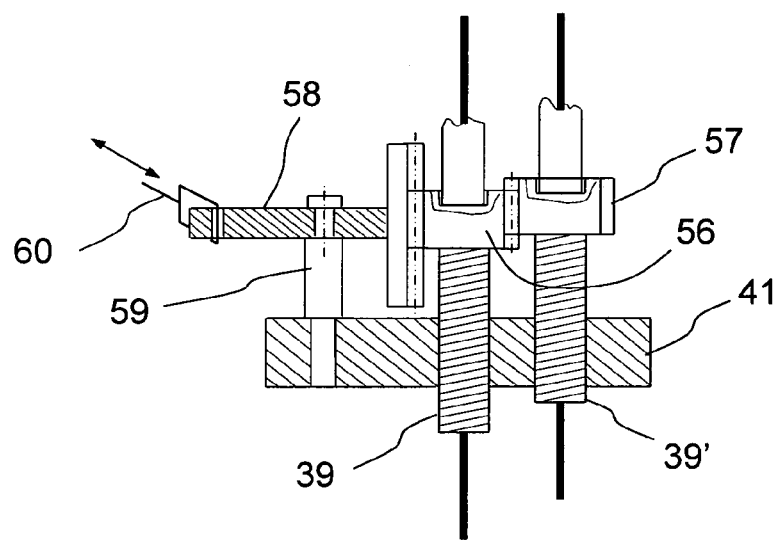
FIG. 17 shows a sectional detail of an assembly by which different transmission ratios can be adjusted for the different sides.

In FIG. 17 and with reference to FIG. 9 an embodiment is shown that provides for the adjustment of the transmission ratio at one side relative to that in the other side. The changes will be introduced in connection with the left Bowden wire 39 and the right Bowden wire 39', but together with this adjustment the ratios of the wires 40 and 40' should be adjusted in an identical way. The adjusting assembly can be mounted on the lower support member 41. The mantle of the wires 39 and 39' are now led through respective bores made in the lower support member 41 and the mantles have respective threads at their end regions. The threaded mantle ends are surrounded by teethed threaded nuts 56, 57, and the threaded nut 56 engages the teeth arranged along a semi circular body of a teethed arced lever 58. The arced lever 58 has a central fixing bore which is pulled on a bolt 59 that allows pivoted rotation for the lever. The bolt 59 is mounted on the lower support member 41. The opposite lever end of the arced lever 58 is connected to a further Bowden wire 60 that pulls it in a plane normal to the plane of the drawing and controls thereby the extent of asymmetry between the left and right sides. The Bowden wire 60 can turn the arced lever 58 in both directions around the bolt 59. In the initial position shown in FIG. 17 the wires 39 and 39' provide the same transmission ratio at both sides. If from this initial position the teethed arc on the arced lever 58 is turned away in either direction, then it will cause turning of the threaded nut 56 in the other (opposite) direction. The teeth of the nut 56 engaging the teeth of the threaded nut 57 and causes its turning in the other (now first) direction. The axial position of the threaded nuts 56 and 57 is fixed, but this opposite rotation causes the axial movement of the threaded mantles in opposite directions normal to the plane of the lower support member 41 (in the drawing upwards and downwards, respectively. As a result of this axial movement the Bowden wires 39 and 39' in the left and right sides will move in opposite directions compared to their initial positions. As a result of this displacement the transmission ratios become different in the left and right sides.

The adjustment of the transmission ratio makes the care of one leg possible but it will have the price that the load will similarly increased in the other side. A number of physiologic human conditions or states are known when one limb care for a transitional period but it can still be exposed to a slighter load. The adjustment of the load between the left and right legs is a task that cannot be solved easily with chain-driven bikes. The possibilities provided by the driving system according to the present invention such as the adjustment of the driving curve that adjusts the driving sensation, furthermore the possibility of adjusting the transmission ratios for the right and left legs have opened so far unprecedented ways, and the value of such adjustment possibilities will be apparent only after the collection of a great number of experiences.

The invention claimed is:

1. A reciprocating drive for a bicycle and or a similar driven vehicle comprising a frame and a driven wheel said driven wheel being rotatably mounted on the frame, said drive comprising a pair of cooperating drive units with complementary driving functions, each of said cooperating drive units being mounted to respective sides of the frame, said drive units each comprising a respective swinging arm pivoted on a respective shaft mounted to the frame to support its respective swinging arm for angularly reciprocating motion around its respective shaft, each swinging arm comprising a respective driving arm with a surface defining a driving path surface, said cooperating drive units comprising a common driving shaft mounted on said frame and rotatably mounted on said frame for rotating motion around a respective driving axis, each of said drive units comprising a respective axle with an axis substantially parallel to said driving axis and connected to and rotating on said common driving shaft along respective circular paths around said driving axis, and a driving follower connected to and pivoted on said bolt, said driving followers being biased to the associated one of said driving path surfaces so that movement of said driving followers moving in a first and then in a returning second direction along said associated driving path surface causing said swinging arm to perform an alternating swinging motion, said driving followers being mechanically coupled to each other through said common driving shaft and extend in substantially opposing directions from the axis of rotation of said common driving shaft, respective flexible ropes being connected to an associated one of said swinging arms, and respective biased rope drums mounted around the shaft of said driven wheel and connected to the driven wheel in a manner that allows transmission of torque to said wheel from said rope drum in a single angular direction of rotation, wherein said ropes are connected to and wound with respective predetermined number of turns around the associated rope drum so that during the driving operation the number of said turns is changing in a mutually alternating manner, each swinging arm further comprising a head portion surrounding its respective swinging shaft and connected to (i) an inner end of said driving arm; (ii) a traction arm, said traction arm having an inner end, said traction arm inner end being connected to said head portion, said traction arm and said driving arm each having respective outer ends opposite their respective inner ends; and (iii) a connection arm interconnecting the outer ends of said driving arm and of said traction arm, wherein said driving arm, traction arm and connection arm define together an opening, and the respective follower being positioned in said opening, said traction arm defining a traction support surface along its length that determines substantially the momentary transmission ratio, and each drive unit comprises at least one rope pulley so that said rope is connected to its respective arm by being wound around said rope pulley, said rope pulley comprising a shaft positioned on said traction support surface.

2. An alternating drive as claimed in claim 1, wherein said traction path is defined by an edge of said traction arm facing towards said opening, and wherein said follower comprises a wheel.

3. A drive as claimed in claim 2, wherein said driving path surface is designed and positioned so that between the farthest point thereof measured from said swinging shaft and a closer point thereon where said swinging arm is at one of its extreme positions during its swinging motion and at which closer point said driving wheel contacts said driving path surface, a first path section is defined to which a straight line section can be fitted, and during the swinging motion this straight line section is offset from said axis of said swinging shaft by a first predetermined distance, and said traction path is positioned in such a way that a further straight line section can be fitted to said traction path being also offset from the same axis of the swinging shaft by a second predetermined distance during said swinging motion.

4. A drive as claimed in claim 3, wherein said first path section of the driving path surface is slightly arced and convex.

5. A drive as claimed in claim 4, wherein said driving path surface has an inflexion point in the region of the inner end of said first path section and is continued in an inward direction by a second path section that has a slightly arced concave shape.

6. A drive as claimed in claim 2, wherein the drive units alternate in being active and the driving path surface is positioned, configured and dimensioned so that after said swinging arm has reached one of its extreme positions, the momentarily active one of said drive units generates a swinging motion with decreasing angular speed that has a higher absolute angular speed value than the angular speed generated by the other momentarily idle drive unit acting already in the same direction, but the angular speed of this momentarily idle drive unit is increasing by a steepness higher than the steepness of the deceleration in the other drive unit, and in the period when the angular speeds provided by the two drive units are close to equal, then the steepness of increase of the accelerating side is slightly higher than the steepness of deceleration in the other side, and this slight difference in steepness take into account the flexible expansion of said rope and creates a smooth transition of the driving task between the two drive units.

7. A drive as claimed in claim 2, wherein said drive unit comprises a pair of identical swinging arm pieces connected to each other so that a space is provided between them.

8. A drive as claimed in claim 7, wherein the central plane of the driving wheel falls in the central plane defined between said swinging arm pieces, and said driving wheel having a nose between its two rolling surfaces that contact and roll along said driving path surface and said nose projecting in said space between said swinging arm pieces to ensure a guiding for said driving wheel.

9. A drive as claimed in claim 2, wherein said rotary motion of said driving shaft is provided by means of respective driving arms, said driving arms being arranged at respective sides of the frame and being rigidly connected to said driving shaft and each driving arm comprises a pair of shanks, wherein the shanks that are located closer to the driving shaft are roughly positioned at an angle with respect to each other of roughly about 180° to each other and their outer ends are connected rigidly to the second shank by means of said bolts, wherein said shanks are positioned at an obtuse angle with respect to each other.

10. A drive as claimed in claim 2, wherein traction support surface forms a traction path, said drive units each comprises respective pairs of rope receiving wheels mounted on and pivoted to said shafts at respective end regions, and the shafts extend across said triangular openings at either side and being biased to and guided along said traction path, wherein said rope receiving wheels are symmetrically arranged at the respective sides of said traction arms and respective branches of said rope are turned around said rope receiving wheels, wherein said triangular opening is sufficiently large to allow guided movement of the rope receiving wheels along the full length of said traction path without colliding with said driving wheels also traveling in the same opening.

11. A drive as claimed in claim 10, wherein the ends of said rope branches are fixed to the associated one of said rope drums, and from starting from said rope branch ends said rope branches are turned in mutually opposite windings around the associated rope drum then leading to said rope wheels, and after having left said rope wheels the rope branches are united and lead through a balance wheel attached to said frame.

12. A drive as claimed in claim 11, wherein said rope branches substantially lead symmetrically relative to the central plane of the associated swinging arm, and the shaft of said balance wheel is pivotally connected to the frame so that the plane defined by the rope branches after leaving the balance wheel is substantially the tangential plane drawn to said rope wheels.

13. A drive as claimed in claim 11, further comprising an adjusting unit for offsetting the relative positions of said shafts on the two sides of the frame to provide differing transmission ratios at the two sides.

14. A drive as claimed in claim 10, further comprising a first Bowden wire that has a mantle fixed to the swinging arm at a position inwardly from and close to the inner end of said traction path; a second Bowden wire that has a mantle also fixed to the swinging arm close to the position where said mantle of the first Bowden wire is fixed; and a direction reversing rope wheel mounted on a shaft coupled to said swinging arm slightly outside from the remote end of said traction path, wherein the first and second Bowden wires are both connected to said shaft of the rope wheels, one of the two Bowden wires being led over said rope wheel prior to connection to said shaft.

15. A drive as claimed in claim 14, wherein said Bowden wires are attached to said shaft by means of a bearing so that said shaft can freely roll along said traction path when being moved.

16. A drive as claimed in claim 14, wherein said drive unit comprises a pair of identical swinging arm pieces connected to each other so that a space is provided between them, and said Bowden wires and said direction reversing rope wheel are arranged in said space between said swinging arm pieces.

17. A drive as claimed in claim 14, wherein said frame comprises an upper and a lower support member attached to respective spaced positions of a rear rod thereof; a speed changing mechanism with Bowden wires that can be pulled and left loose by said mechanism; a pair of rock levers each having a central and two lever end connection points, the mantles of said Bowden wires being fixed at said upper support member; said Bowden wires being connected each to the central connection point of a respective one of said rock levers, in each drive unit the Bowden wires that perform identical function being connected to the lever end points of a corresponding one of said rock levers, while those performing an opposite function are connected to the lever ends of the other one of said rock levers, and the mantles of said Bowden wires in said drive units being connected to said lower support member.

18. A drive as claimed in claim 10, wherein a discrete series of recesses are defined in the edges of said traction arms, and each of said recesses can temporarily engage said shaft and maintain its position during the swinging motion.

19. A drive as claimed in claim 18, wherein said recesses along said traction path have respective asymmetric profiles and the asymmetry corresponds to the directions of the rope forces that act on the particular recess when the swinging arm takes its two extreme positions.

20. A drive as claimed in claim 2, further comprising respective adjusting mechanisms in said head portions of said swinging arms that similarly adjusts the position of the center of rotation of the swinging movement relative to the center of said swinging shaft to simultaneously change the driving characteristic of said drive units.

21. A drive as claimed in claim 2, wherein said swinging arm said driving arm forms an angle with said traction arm, and said opening has a roughly triangular form.

22. An alternating drive as claimed in claim 1, wherein said follower comprises a wheel.

23. A drive as claimed in claim 1, wherein said respective shafts are mounted in the frame and form a common swinging shaft.

* * * * *